United States Patent
Noda

(10) Patent No.: US 10,274,709 B2
(45) Date of Patent: Apr. 30, 2019

(54) IMAGING LENS AND IMAGING APPARATUS

(71) Applicant: FUJIFILM Corporation, Tokyo (JP)

(72) Inventor: Taiga Noda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 185 days.

(21) Appl. No.: 15/621,542

(22) Filed: Jun. 13, 2017

(65) Prior Publication Data

US 2018/0059382 A1  Mar. 1, 2018

(30) Foreign Application Priority Data

Aug. 23, 2016 (JP) ................................ 2016-162463

(51) Int. Cl.
| | | |
|---|---|---|
| *G02B 15/16* | (2006.01) | |
| *G02B 15/22* | (2006.01) | |
| *G02B 15/173* | (2006.01) | |
| *G02B 13/00* | (2006.01) | |
| *G02B 27/64* | (2006.01) | |
| *G02B 13/14* | (2006.01) | |
| *G02B 26/00* | (2006.01) | |
| *G02B 27/00* | (2006.01) | |

(52) U.S. Cl.
CPC ......... *G02B 15/16* (2013.01); *G02B 13/0045* (2013.01); *G02B 15/173* (2013.01); *G02B 15/22* (2013.01); *G02B 27/646* (2013.01); *G02B 13/0005* (2013.01); *G02B 13/146* (2013.01); *G02B 26/002* (2013.01); *G02B 27/0025* (2013.01)

(58) Field of Classification Search
CPC ...... G02B 15/14; G02B 15/16; G02B 15/173; G02B 15/22; G02B 13/02; G02B 13/04

USPC ........................................ 359/683, 685, 693
See application file for complete search history.

(56) References Cited

U.S. PATENT DOCUMENTS

| | | | | |
|---|---|---|---|---|
| 5,299,064 A | * | 3/1994 | Hamano | G02B 15/173 |
| | | | | 359/683 |
| 8,411,361 B2 | * | 4/2013 | Take | G02B 27/646 |
| | | | | 359/557 |
| 9,134,515 B2 | * | 9/2015 | Ishibashi | G02B 15/173 |
| 9,829,681 B2 | * | 11/2017 | Mori | G02B 15/173 |
| 2011/0199689 A1 | | 8/2011 | Ishibashi | |
| 2014/0334014 A1 | | 11/2014 | Matsui | |

FOREIGN PATENT DOCUMENTS

| | | |
|---|---|---|
| JP | 5584064 B2 | 9/2014 |
| JP | 2014-219601 A | 11/2014 |
| JP | 5675397 B2 | 2/2015 |

\* cited by examiner

*Primary Examiner* — Zachary W Wilkes
(74) *Attorney, Agent, or Firm* — Studebaker & Brackett PC

(57) ABSTRACT

The imaging lens includes, in order from an object side, a first lens group having positive refractive power, a second lens group having negative refractive power, a third lens group having positive refractive power, a fourth lens group having positive refractive power, and a fifth lens group having negative refractive power. In a case of changing focus from an object at infinity to an object at the closest distance, the first lens group is immovable, and the second lens group and the fourth lens group are moved in an optical axis direction along different trajectories from each other. In addition, predetermined conditional expressions (1) to (3) are satisfied.

20 Claims, 12 Drawing Sheets

FIG. 1
EXAMPLE 1
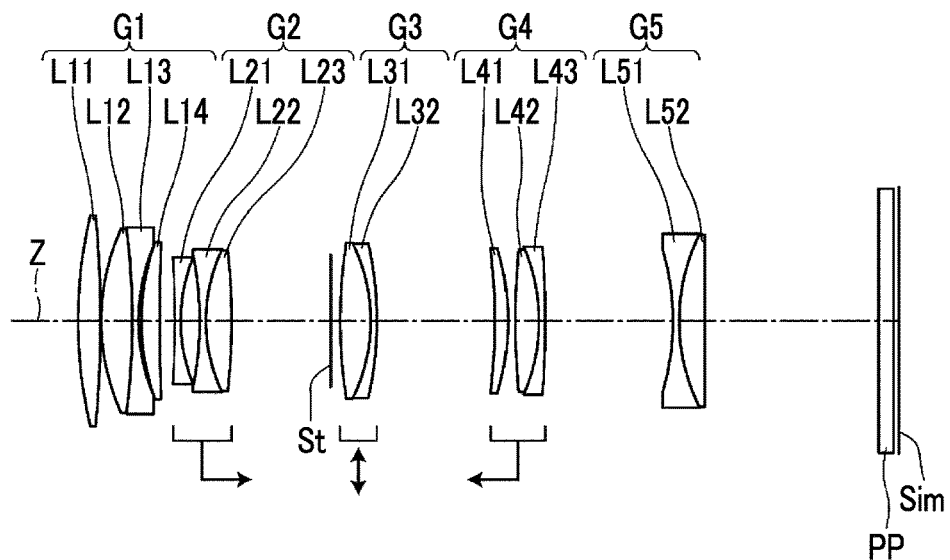
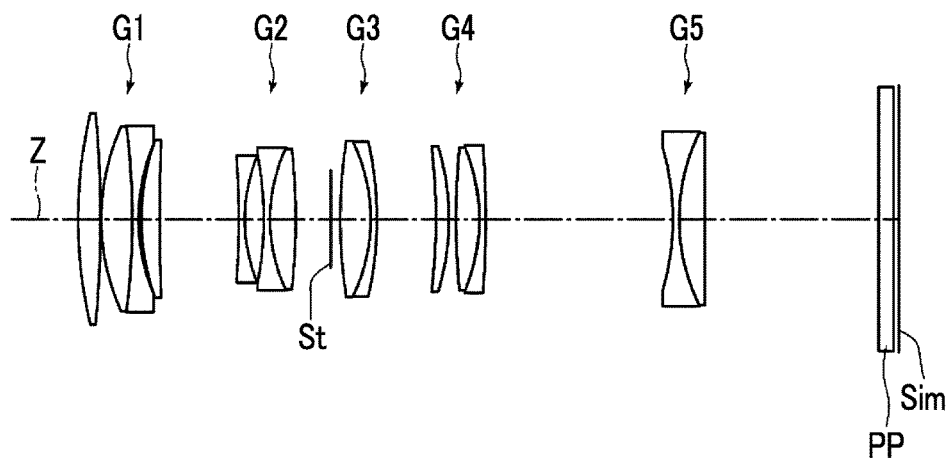

FIG. 2
EXAMPLE 2
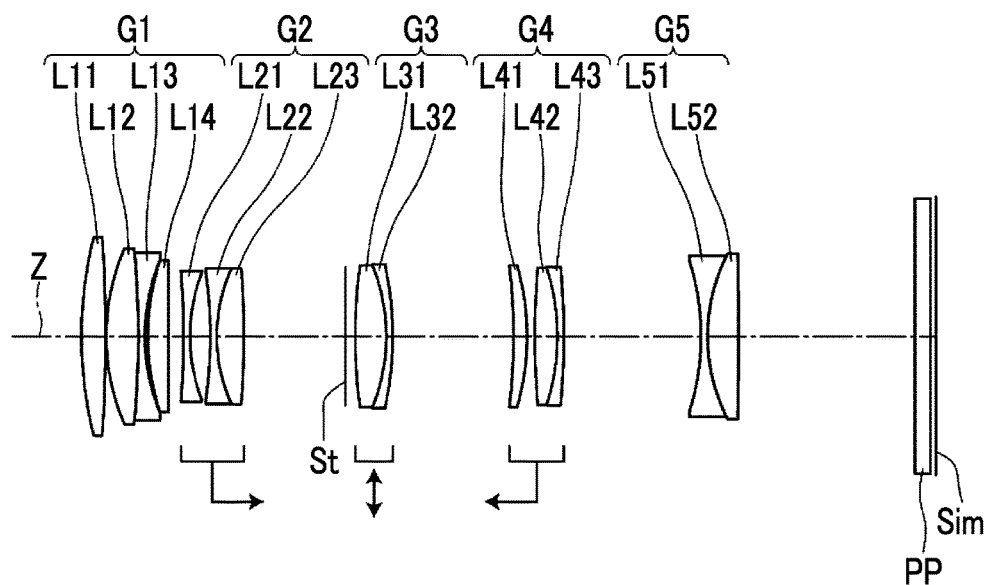
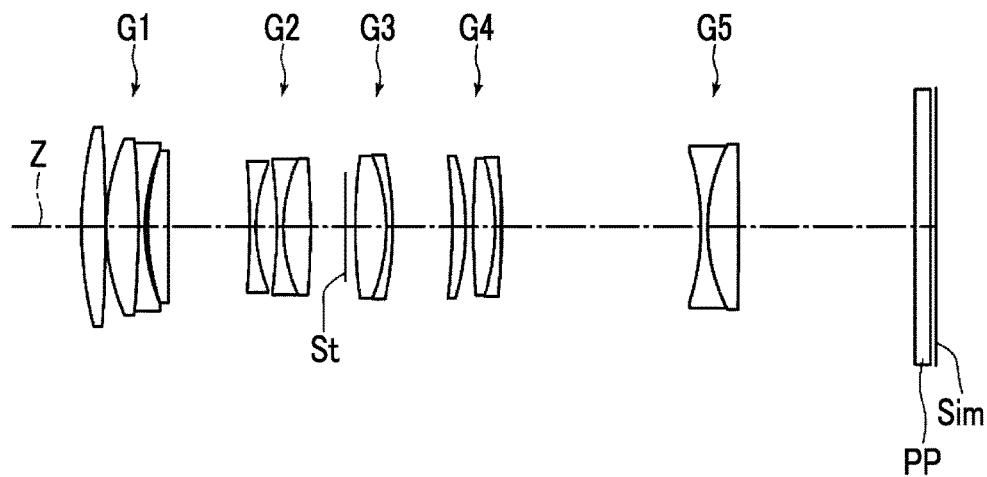

FIG. 3
EXAMPLE 3
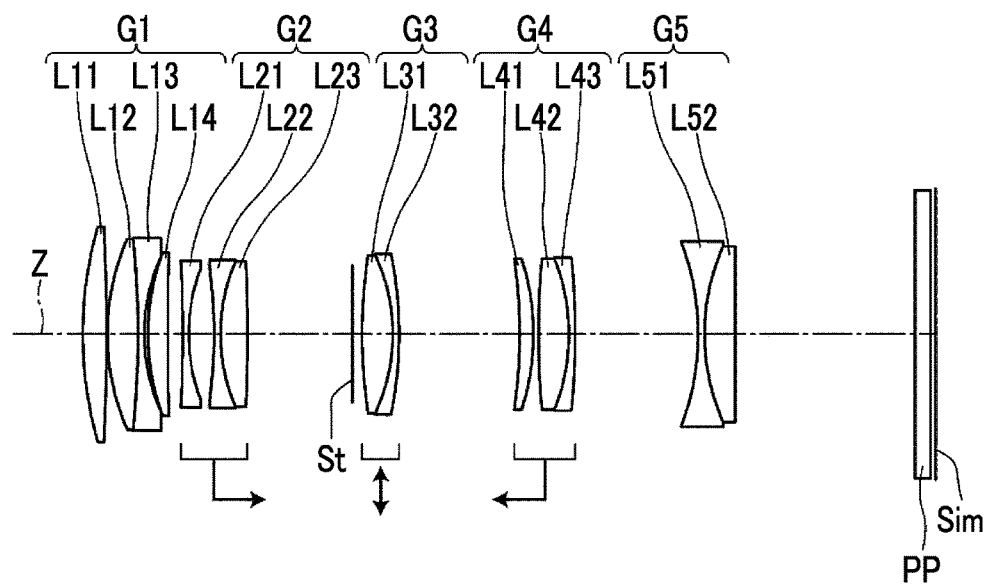
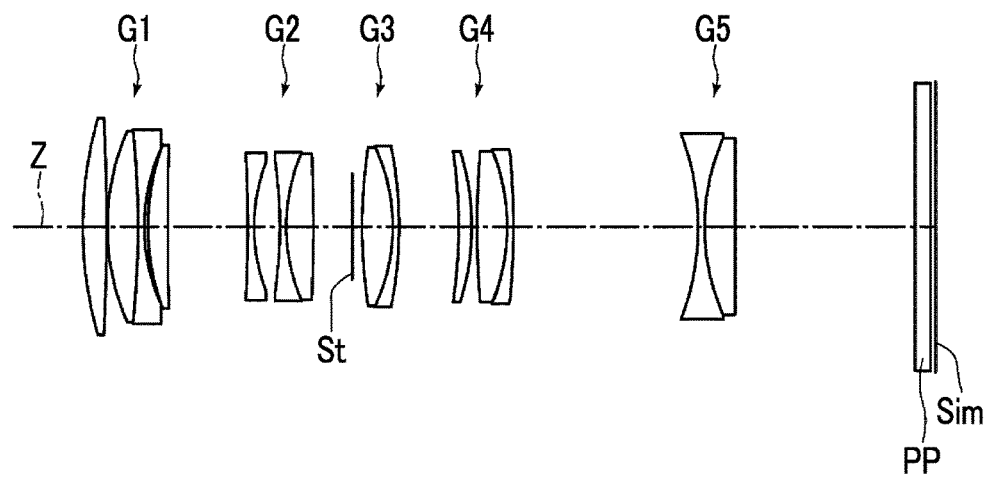

FIG. 4
EXAMPLE 4
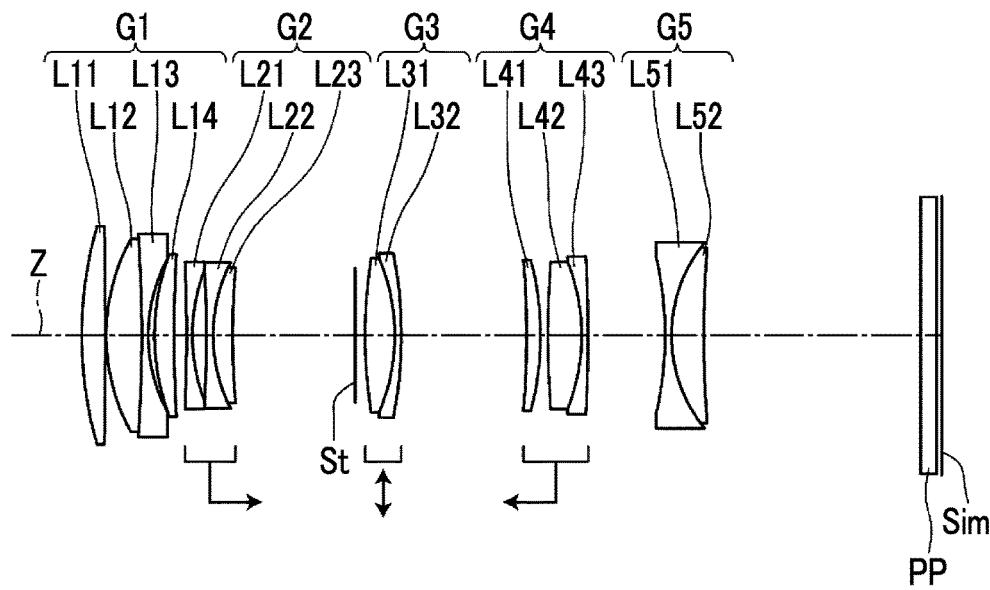
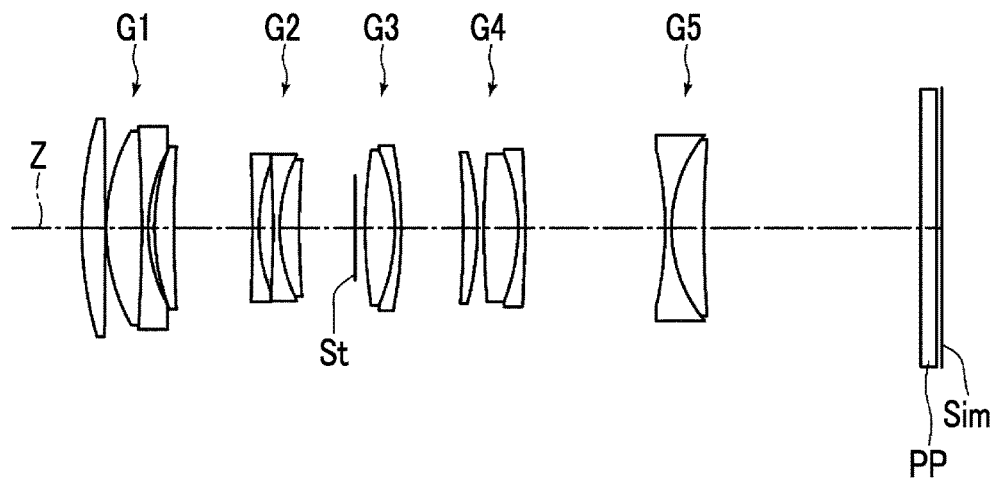

FIG. 5
EXAMPLE 5
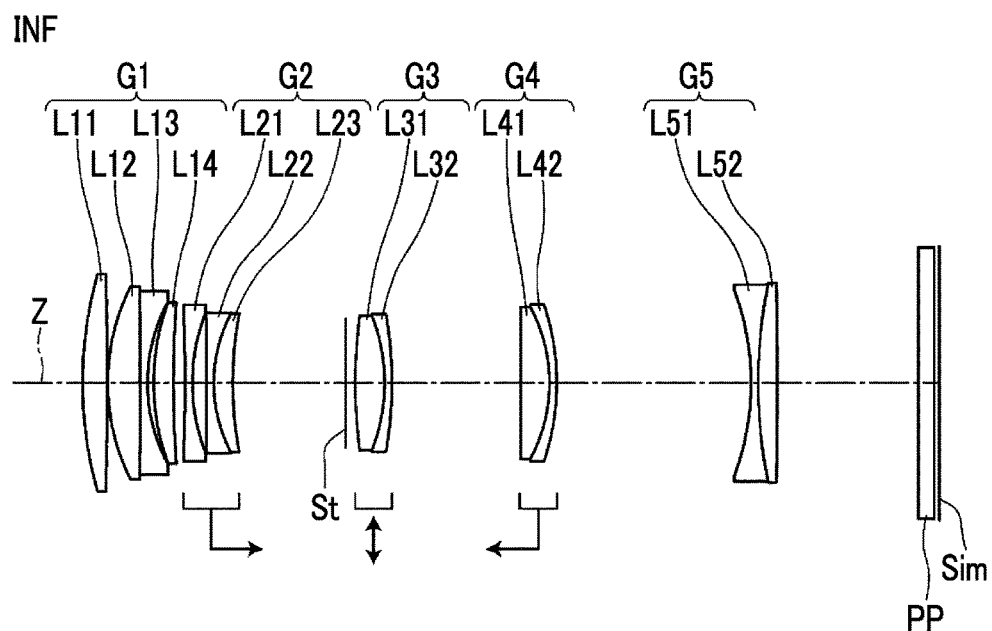
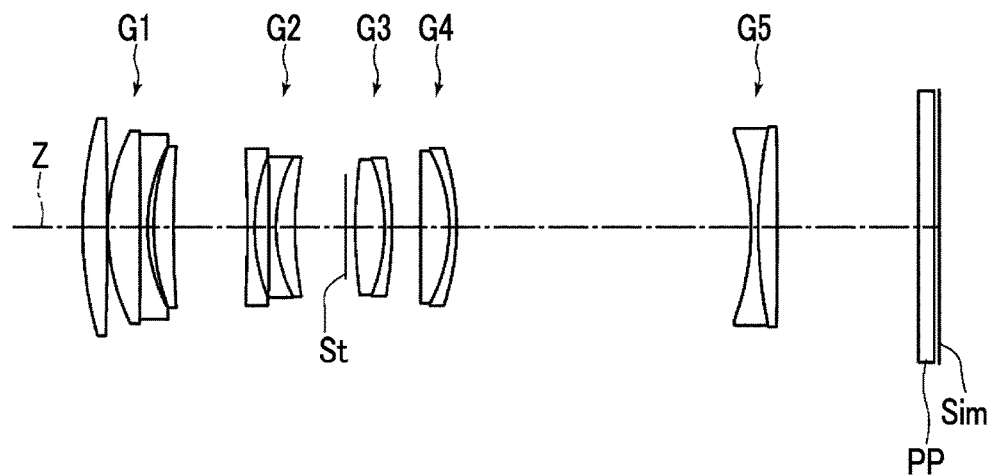

IMAGING LENS AND IMAGING APPARATUS

CROSS REFERENCE TO RELATED APPLICATIONS

The present application claims priority under 35 U.S.C. § 119 to Japanese Patent Application No. 2016-162463 filed on Aug. 23, 2016. The above application is hereby expressly incorporated by reference, in its entirety, into the present application.

BACKGROUND

Field of the Invention

The present invention relates to an imaging lens suitable for an electronic camera, such as a digital camera or a video camera, and an imaging apparatus including the imaging lens.

Related Art

Hitherto, an imaging lens which is intended to perform short-distance imaging with an absolute value of an imaging magnification equal to or greater than 0.3 times is known. As such an imaging lens, JP2014-219601A, JP5584064B, and JP5675397B have suggested a lens system having a five-group configuration in which a positive first lens group, a negative second lens group, a positive third lens group, a positive fourth lens group, and a negative fifth lens group are arranged in order from an object side. In the imaging lenses described in JP2014-219601A, JP5584064B, and JP5675397B, in a case of changing focus from infinity to a close distance, the second lens group and the fourth lens group are moved.

SUMMARY

In general, if a position error is caused by lens control during focusing, defocus occurs. In a lens capable of short-distance imaging described above, defocus due to a position error of the lens is not preferable. Furthermore, in recent years, since the number of imaging pixels of a camera is increasing, there is demand for correction of aberrations to a higher degree. In addition, it is desirable for making a lens system compact with reduction in size of a camera.

In the imaging lens described in JP2014-219601A, the ratio of a total length to a back focus is large. Furthermore, since the ratio of a surface on the most object side of the lens to a surface on the most image side is large, a lens portion increases in weight and size. In the imaging lens described in JP5584064B, the difference in sensitivity between a first focus group and a second focus group is large, and focus is apt to vary in a case where the distance between the focus groups varies. In the imaging lens described in JP5675397B, since the absolute value of the sum of sensitivity of a first focus group and a second focus group is large, focus is apt to vary in a case where the focus groups deviate in an optical axis direction simultaneously.

The invention has been accomplished in consideration of the above-described situation, and an object of the invention is to provide an imaging lens which is capable of short-distance imaging, makes defocus due to a lens position error hard to occur and is compact, and in which aberrations are satisfactorily corrected, and an imaging apparatus including the imaging lens.

An imaging lens of the invention comprises, in order from an object side, a first lens group having positive refractive power, a second lens group having negative refractive power, a third lens group having positive refractive power, a fourth lens group having positive refractive power, and a fifth lens group having negative refractive power. In a case of changing focus from an object at infinity to an object at the closest distance, the distance between adjacent lens groups changes, in a case of changing focus from the object at infinity to the object at the closest distance, the first lens group is immovable, in a case of changing focus from the object at infinity to the object at the closest distance, the second lens group and the fourth lens group are moved in an optical axis direction along different trajectories from each other, and the following conditional expressions are satisfied.

$$-1.5<(1-\beta 2^2)\times\beta 2r^2+(1-\beta 4^2)\times\beta 4r^2<0 \quad (1)$$

$$-5.5<(1-\beta 2^2)\times\beta 2r^2-(1-\beta 4^2)\times\beta 4r^2<-2.5 \quad (2)$$

$$3<TL/BF<5.9 \quad (3)$$

where

β2: a lateral magnification of the second lens group in a state of being focused at infinity β2r: a combined lateral magnification of a lens group disposed on the image side from the second lens group in a state of being focused at infinity β4: a lateral magnification of the fourth lens group in a state of being focused at infinity β4r: a combined lateral magnification of a lens group disposed on the image side from the fourth lens group in a state of being focused at infinity TL: a lens total length in a case where an air converted length corresponds to a back focus BF: the air converted distance between an image-side surface apex of a lens on the most image side of a lens system and an image plane.

In the imaging lens of the invention, it is preferable that the following conditional expression is satisfied;

$$0.7<f/f4<1.4 \quad (4)$$

where f: a focal length with respect to d line of the entire lens system in a state of being focused at infinity f4: a focal length with respect to d line of the fourth lens group.

It is preferable that the following conditional expression is satisfied;

$$-0.6<f2/f4<-0.2 \quad (5)$$

where f2: a focal length with respect to d line of the second lens group f4: the focal length with respect to d line of the fourth lens group.

It is preferable that the following conditional expression is satisfied;

$$0.61<DL/TL<0.82 \quad (6)$$

where

DL: the distance between a surface apex on the most object side and a surface apex on the most image side of the lens system in a state of being focused at infinity TL: the lens total length in a case where the air converted length corresponds to the back focus.

It is preferable that the fourth lens group has a cemented lens in which a positive lens and a negative lens are cemented in order from the object side.

In this case, it is preferable that the following conditional expression is satisfied;

$$41 < vd4p - vd4n < 58 \tag{7}$$

where vd4p: an Abbe number with respect to d line of the positive lens of the fourth lens group vd4n: an Abbe number with respect to d line of the negative lens of the fourth lens group.

It is preferable that the second lens group is moved toward the image side in a case of changing focus from the object at infinity to the object at the closest distance, and the fourth lens group is moved toward the object side in a case of changing focus from the object at infinity to the object at the closest distance.

It is preferable that the fifth lens group has one lens component.

In this case, it is preferable that the fifth lens group has a cemented lens in which a negative lens and a positive lens are cemented in order from the object side.

In this case, it is preferable that the following conditional expression is satisfied;

$$30 < vd5p < 45 \tag{8}$$

where vd5p: an Abbe number with respect to d line of the positive lens of the fifth lens group.

In the imaging lens of the invention, it is preferable that the following conditional expression is satisfied;

$$-2 < f/f5 < -0.8 \tag{9}$$

where f: the focal length with respect to d line of the entire lens system in a state of being focused at infinity f5: a focal length with respect to d line of the fifth lens group.

It is preferable that the following conditional expression is satisfied;

$$1.4 < f/f1 < 2.0 \tag{10}$$

where f: the focal length with respect to d line of the entire lens system in a state of being focused at infinity f1: a focal length with respect to d line of the first lens group.

An imaging apparatus of the invention comprises the imaging lens of the invention described above.

The term "comprise" means that the imaging lens of the invention may include, in addition to the lens groups or lenses listed above, lenses substantially having no power, optical elements, such as a stop, a mask, a cover glass, and a filter, other than the lenses, mechanical parts, such as a lens flange, a lens barrel, an imaging element, and a camera shake correction mechanism, and the like.

The surface shapes and the signs of refractive power of the above-described lenses are those which are considered in a paraxial region in a case where the lenses include aspheric surfaces.

The term "lens group" is not necessarily limited to those including a plurality of lenses, and may include those including only one lens. The expression "lens group having positive refractive power" means that the entire lens group has positive refractive power. The same applies to the expression "lens group having negative refractive power".

The term "lens component" refers to a lens with only two surfaces including a surface on the object side and a surface on the image side in contact with air on the optical axis, and one lens component means one single lens or one cemented lens.

The lens total length means the distance (the air converted length corresponds to the back focus) between a surface apex on the most object side of the lens system and the image plane in a state of being focused at infinity.

In the imaging lens of the invention, it is preferable that any of the following conditional expressions (1-1) to (7-1) is satisfied. In the imaging lens of the invention, any one or an arbitrary combination of the conditional expressions (1) to (7-1) may be satisfied.

$$-1.35 < (1-\beta2^2) \times \beta2r^2 + (1-\beta4^2) \times \beta4r^2 < -0.02 \tag{1-1}$$

$$-5.0 < (1-\beta2^2) \times \beta2r^2 - (1-\beta4^2) \times \beta4r^2 < -3.2 \tag{2-1}$$

$$3.3 < TL/BF < 5.7 \tag{3-1}$$

$$0.8 < f/f4 < 1.3 \tag{4-1}$$

$$-0.57 < f2/f4 < -0.3 \tag{5-1}$$

$$0.66 < DL/TL < 0.815 \tag{6-1}$$

$$42 < vd4p - vd4n < 56 \tag{7-1}$$

The imaging lens of the invention includes, in order from the object side, the first lens group having positive refractive power, the second lens group having negative refractive power, the third lens group having positive refractive power, the fourth lens group having positive refractive power, and the fifth lens group having negative refractive power, in a case of changing focus from the object at infinity to the object at the closest distance, the first lens group is immovable, in a case of changing focus from the object at infinity to the object at the closest distance, and the second lens group and the fourth lens group are moved in the optical axis direction along different trajectories from each other. For this reason, it is possible to suppress variations in aberrations from infinity to a close distance while realizing an optical system capable of short-distance imaging. Furthermore, since the conditional expressions (1) to (3) are satisfied, it is possible to reduce defocus while suppressing variations in aberrations, and to reduce the size and weight of the lens system.

Since the imaging apparatus of the invention includes the imaging lens of the invention, it is possible to obtain video with high image quality.

BRIEF DESCRIPTION OF THE DRAWINGS

FIG. 1 is a sectional view showing the lens configuration of an imaging lens according to an embodiment of the invention (common with Example 1).

FIG. 2 is a sectional view showing the lens configuration of an imaging lens of Example 2 of the invention.

FIG. 3 is a sectional view showing the lens configuration of an imaging lens of Example 3 of the invention.

FIG. 4 is a sectional view showing the lens configuration of an imaging lens of Example 4 of the invention.

FIG. 5 is a sectional view showing the lens configuration of an imaging lens of Example 5 of the invention.

DESCRIPTION OF THE PREFERRED EMBODIMENTS

Figure 6:
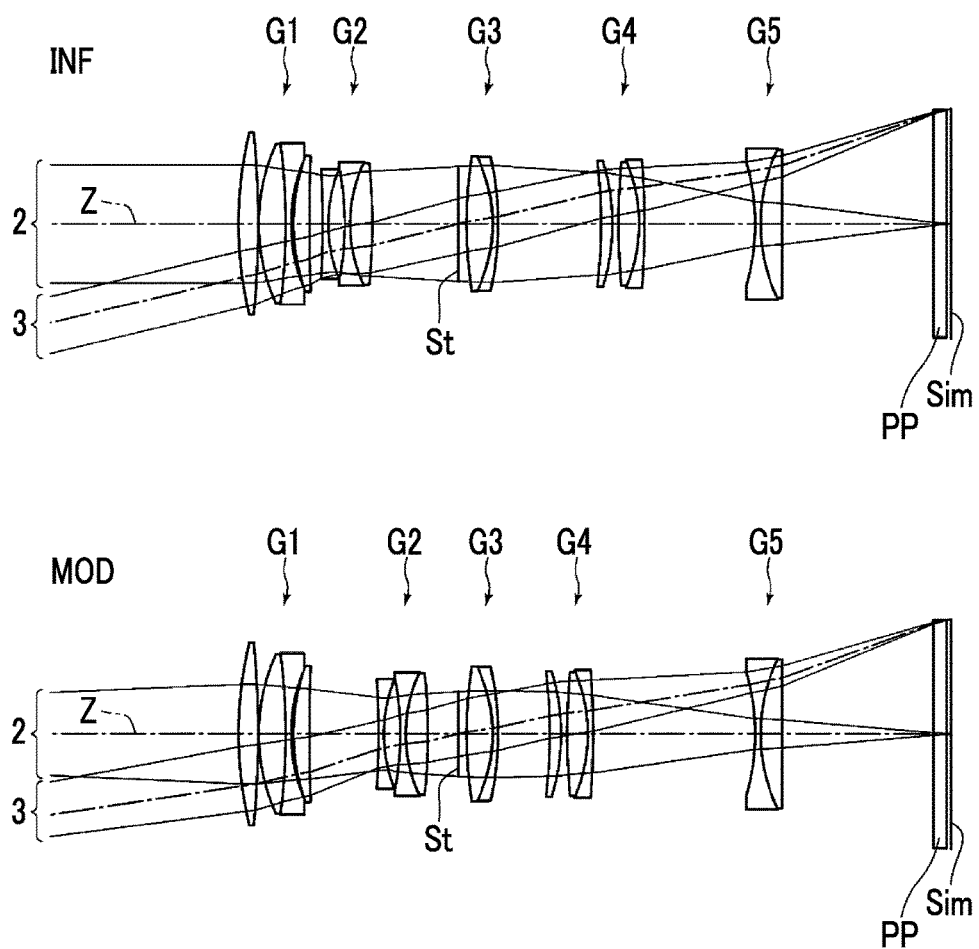
FIG. 6 is an optical path diagram of the imaging lens according to the embodiment of the invention (common with Example 1).

Hereinafter, an embodiment of the invention will be described in detail referring to the drawings. FIG. 1 is a sectional view showing the lens configuration of an imaging lens according to the embodiment of the invention (common with Example 1). A configuration example shown in FIG. 1 is common with the configuration of an imaging lens of Example 1 described below. In FIG. 1, the left side is an object side, and the right side is an image side. FIG. 6 is an optical path diagram in the imaging lens according to the embodiment shown in FIG. 1, and shows optical paths of an axial light beam 2 from an object point at infinity and a light beam 3 at a maximum angle of view. FIGS. 1 and 6 and FIGS. 2 to 5 described below show lens configurations in a state (INF) of being focused at infinity and a state (MOD) of being focused at the closest distance in which an image forming magnification becomes −0.5 times.

As shown in FIGS. 1 and 2, the imaging lens of this embodiment includes a first lens group G1 having positive refractive power, a second lens group G2 having negative refractive power, a third lens group G3 having positive refractive power, a fourth lens group G4 having positive refractive power, and a fifth lens group G5 having negative refractive power along an optical axis Z in order from the object side. An aperture stop St is disposed between the second lens group G2 and the third lens group G3. In a case of changing focus from an object at infinity to an object at the closest distance, the distance between adjacent lens groups changes, the first lens group G1 is immovable with respect to an image plane Sim, and the second lens group G2 and the fourth lens group G4 are moved in the optical axis direction along different trajectories from each other. The third lens group G3 is moved in a direction intersecting the optical axis to perform camera shake correction. The aperture stop St does not necessarily represent the size and/or shape thereof, but indicates the position of the stop on an optical axis Z.

In the example shown in FIG. 1, the first lens group G1 has four lenses including lenses L11 to L14 in order from the object side, the second lens group G2 has three lenses including lenses L21 to L23 in order from the object side, the third lens group G3 has two lenses including lenses L31 and L32 in order from the object side, the fourth lens group G4 has three lenses including lenses L41 to L43 in order from the object side, and the fifth lens group G5 has two lenses including lenses L51 and L52 in order from the object side. However, each lens group may have a different number of lenses from the example shown in FIG. 1.

In a case where the imaging lens of this embodiment is applied to an imaging apparatus, it is preferable that a cover glass, a prism, and various filters, such as an infrared cut filter and a low-pass filter, are disposed between an optical system and the image plane Sim according to the configuration on the camera side on which the lens is mounted. For this reason, FIG. 1 shows an example where a parallel flat plate-shaped optical member PP which is assumed to represent these elements is disposed between the lens system and the image plane Sim.

The imaging lens of this embodiment is configured such that the following conditional expressions (1) to (3) are satisfied;

$$-1.5 < (1-\beta2^2) \times \beta2r^2 + (1-\beta4^2) \times \beta4r^2 < 0 \tag{1}$$

$$-5.5 < (1-\beta2^2) \times \beta2r^2 - (1-\beta4^2) \times \beta4r^2 < -2.5 \tag{2}$$

$$3 < TL/BF < 5.9 \tag{3}$$

where $\beta2$: a lateral magnification of the second lens group G2 in a state of being focused at infinity $\beta2r$: a combined lateral magnification of a lens group disposed on the image side from the second lens group G2 in a state of being focused at infinity $\beta4$: a lateral magnification of the fourth lens group G4 in a state of being focused at infinity $\beta4r$: a combined lateral magnification of a lens group disposed on the image side from the fourth lens group G4 in a state of being focused at infinity TL: a lens total length in a case where an air converted length corresponds to a back focus BF: the air converted distance between an image-side surface apex of a lens on the most image side of a lens system and an image plane.

In the imaging lens of this embodiment, a lens group which is disposed on the image side from the fourth lens group G4 is only the fifth lens group G5. For this reason, $\beta4r$ substantially becomes a lateral magnification of the fifth lens group G5 in a state of being focused at infinity.

As described above, the imaging lens is configured with five groups of positive, negative, positive, positive, and negative, and during focusing, the first lens group G1 is immovable and the second lens group G2 and the fourth lens group G4 are moved in the optical axis direction along different trajectories from each other, whereby it is possible to make a group configuration suitable for minimizing variations in spherical aberration and astigmatism from infinity to a close distance while realizing an optical system capable of short-distance imaging with an absolute value of an imaging magnification equal to or greater than 0.3 times. Furthermore, it is possible to reduce the lens total length. In a case where the imaging lens of this embodiment is applied to a mirror-less camera with a short back focus, telecentricity is easily secured. That is, it becomes easy to make principal rays as parallel to the optical axis as possible. Furthermore, since the lens total length does not change during focusing, convenience in short-distance imaging is high. In addition, it is possible to suppress variation in an angle of view during focusing.

The imaging lens is configured such that the value of $(1-\beta2^2) \times \beta2r^2 + (1-\beta4^2) \times \beta4r^2$ is not equal to or less than a lower limit defined in the conditional expression (1), whereby the focus position is made hard to move even if both of the second lens group G2 and the fourth lens group G4 deviate in the optical axis direction. For this reason, it is possible to make defocus due to deviation of a stop position of focus control hard to occur.

In the conditional expression (1), the value of $(1-\beta2^2)\times\beta2r^2$ becomes a negative value, and the value of $(1-\beta4^2)\times\beta4r^2$ becomes a positive value. The imaging lens is configured such that the value of $(1-\beta2^2)\times\beta2r^2+(1-\beta4^2)\times\beta4r^2$ is not equal to or greater than an upper limit defined in the conditional expression (1), whereby, since it is possible to maintain the absolute value of $(1-\beta2^2)\times\beta2r^2$ large, it is possible to suppress variation in astigmatism during focusing.

The imaging lens is configured such that the value of $(1-\beta2^2)\times\beta2r^2-(1-\beta4^2)\times\beta4r^2$ is not equal to or less than a lower limit defined in the conditional expression (2), whereby it is possible to reduce defocus when the distance between the second lens group G2 and the fourth lens group varies. For this reason, it is possible to make defocus hard to occur even if there is a component error, an assembling error, or an error caused by focus control.

The imaging lens is configured such that the value of $(1-\beta2^2)\times\beta2r^2-(1-\beta4^2)\times\beta4r^2$ is not equal to or greater than an upper limit defined in the conditional expression (2), whereby, since it is possible to reduce the amount of movement of the second lens group G2 and the fourth lens group G4 during focusing, it is possible to reduce the size of the lens system.

The imaging lens is configured such that the value of TL/BF is not equal to or less than a lower limit defined in the conditional expression (3), whereby it is possible to secure a space for a focusing unit including the second lens group G2 and the fourth lens group G4 in the lens system.

The imaging lens is configured such that the value of TL/BF is not equal to or greater than an upper limit defined in the conditional expression (3), whereby, since it is possible to reduce the lens total length with respect to the back focus, it is possible to achieve reduction in size and weight of the lens system.

In order to further increase the effects relating to the respective conditional expressions (1) to (3), it is more preferable that the following conditional expressions (1-1) to (3-1) are respectively satisfied.

$$-1.35<(1-\beta2^2)\times\beta2r^2+(1-\beta4^2)\times\beta4r^2<-0.02 \quad (1-1)$$

$$-5.0<(1-\beta2^2)\times\beta2r^2-(1-\beta4^2)\times\beta4r^2<-3.2 \quad (2-1)$$

$$3.3<TL/BF<5.7 \quad (3-1)$$

In the imaging lens of this embodiment, it is preferable that the following conditional expression (4) is satisfied.

$$0.7<f/f4<1.4 \quad (4)$$

where f: a focal length with respect to d line of the entire lens system in a state of being focused at infinity f4: a focal length with respect to d line of the fourth lens group G4.

The imaging lens is configured such that the value of f/f4 is not equal to or less than a lower limit defined in the conditional expression (4), whereby, since it is possible to suppress the height of off-axial rays on the image side from the fourth lens group G4, it is possible to achieve reduction in size of the lens system in a radial direction. In particular, in a case where the imaging lens of this embodiment is applied to a lens interchangeable imaging apparatus, it is possible to achieve reduction in size around a mount for attaching the lens in the imaging apparatus.

The imaging lens is configured such that the value of f/f4 is not equal to or greater than an upper limit defined in the conditional expression (4), whereby it is possible to suppress variation in astigmatism during focusing.

In order to further increase the effect relating to the conditional expression (4), it is more preferable that the following conditional expression (4-1) is satisfied.

$$0.8<f/f4<1.3 \quad (4-1)$$

It is preferable that the following conditional expression (5) is satisfied.

$$-0.6<f2/f4<-0.2 \quad (5)$$

where f2: a focal length with respect to d line of the second lens group G2 f4: the focal length with respect to d line of the fourth lens group G4.

The imaging lens is configured such that the value of f2/f4 is not equal to or less than a lower limit defined in the conditional expression (5), whereby, since it is possible to increase the power of the second lens group G2 and to decrease the power of the fourth lens group G4, it is possible to suppress variation in astigmatism during focusing.

The imaging lens is configured such that the value of f2/f4 is not equal to or greater than an upper limit defined in the conditional expression (5), whereby, since it is possible to decrease the power of the second lens group G2 and to increase the power of the fourth lens group G4, it is possible to suppress variation in spherical aberration during focusing.

In order to further increase the effect relating to the conditional expression (5), it is more preferable that the following conditional expression (5-1) is satisfied.

$$-0.57<f2/f4<-0.3 \quad (5-1)$$

It is preferable that the following conditional expression (6) is satisfied.

$$0.61<DL/TL<0.82 \quad (6)$$

where

DL: the distance between a surface apex on the most object side and a surface apex on the most image side of the lens system in a state of being focused at infinity TL: the lens total length in a case where the air converted length corresponds to the back focus.

The imaging lens is configured such that the value of DL/TL is not equal to or less than a lower limit defined in the conditional expression (6), whereby it is possible to secure a space for a focusing unit including the second lens group G2 and the fourth lens group G4 in the lens system.

The imaging lens is configured such that the value of DL/TL is not equal to or greater than an upper limit defined in the conditional expression (6), whereby it is possible to reduce the ratio of a lens component in an optical system. In a case where the imaging lens of this embodiment is applied to an interchangeable lens, it is possible to achieve reduction in weight and size of the lens itself.

In order to further increase the effect relating to the conditional expression (6), it is more preferable that the following conditional expression (6-1) is satisfied.

$$0.66<DL/TL<0.815 \quad (6-1)$$

It is preferable that the fourth lens group G4 has a cemented lens in which the positive lens L42 and the negative lens L43 are cemented in order from the object side. With this, it is possible to satisfactorily correct secondary lateral chromatic aberration.

In a case where the fourth lens group G4 has the cemented lens in which the positive lens L42 and the negative lens L43 are cemented in order from the object side, it is preferable that the following conditional expression (7) is satisfied.

$$41 < vd4p - vd4n < 58 \tag{7}$$

where vd4p: an Abbe number with respect to d line of the positive lens L42 of the fourth lens group G4 vd4n: an Abbe number with respect to d line of the negative lens L43 of the fourth lens group G4.

The conditional expression (7) is satisfied, whereby it is possible to suppress variation in lateral chromatic aberration during focusing with satisfactory balance.

In order to further increase the effect relating to the conditional expression (7), it is more preferable that the following conditional expression (7-1) is satisfied.

$$42 < vd4p - vd4n < 56 \tag{7-1}$$

It is preferable that the second lens group G2 is moved toward the image side in a case of changing focus from the object at infinity to the object at the closest distance, and the fourth lens group G4 is moved toward the object side in a case of changing focus from the object at infinity to the object at the closest distance. With this, since it is possible to move the second lens group G2 and the fourth lens group G4 in opposite directions during focusing, it is possible to reduce variations in aberrations in a case where the lens groups deviate in the same direction at the time of assembling or the like.

It is preferable that the fifth lens group G5 has one lens component. With this, since it is possible to simplify the configuration of an image-side portion of the lens system, it is possible to reduce the size of the lens system. Furthermore, it becomes easy to secure a space where an actuator for the fourth lens group G4 as a focus group is disposed. In addition, in a case where the imaging lens of this embodiment is applied to a lens interchangeable imaging apparatus, it is possible to achieve reduction in size around a mount for attaching the lens.

It is preferable that the fifth lens group G5 has a cemented lens in which the negative lens L51 and the positive lens L52 are cemented in order from the object side. With this, it is possible to satisfactorily correct lateral chromatic aberration.

In a case where the fifth lens group G5 has the cemented lens in which the negative lens L51 and the positive lens L52 are cemented in order from the object side, it is preferable that the following conditional expression (8) is satisfied.

$$30 < vd5p < 45 \tag{8}$$

where vd5p: an Abbe number with respect to d line of the positive lens L52 of the fifth lens group G5.

The conditional expression (8) is satisfied, whereby it is possible to correct secondary lateral chromatic aberration with satisfactory balance.

In order to further increase the effect relating to the conditional expression (8), it is more preferable that the following conditional expression (8-1) is satisfied.

$$31 < vd5p < 41 \tag{8-1}$$

It is preferable that the following conditional expression (9) is satisfied.

$$-2 < f/f5 < -0.8 \tag{9}$$

where f: the focal length with respect to d line of the entire lens system in a state of being focused at infinity f5: a focal length with respect to d line of the fifth lens group G5.

The imaging lens is configured such that the value of f/f5 is not equal to or less than a lower limit defined in the conditional expression (9), whereby it is possible to secure telecentricity.

The imaging lens is configured such that the value of f/f5 is not equal to or greater than an upper limit defined in the conditional expression (9), whereby, since it is possible to reduce a back focus, it is possible to reduce the lens total length. Furthermore, it is possible to secure a space for a focusing unit including the second lens group G2 and the fourth lens group G4 in the lens system.

In order to further increase the effect relating to the conditional expression (9), it is more preferable that the following conditional expression (9-1) is satisfied.

$$-1.9 < f/f5 < -0.9 \tag{9-1}$$

It is preferable that the following conditional expression (10) is satisfied.

$$1.4 < f/f1 < 2.0 \tag{10}$$

where f: the focal length with respect to d line of the entire lens system in a state of being focused at infinity f1: a focal length with respect to d line of the first lens group G1.

The imaging lens is configured such that the value of f/f1 is not equal to or less than a lower limit defined in the conditional expression (10), whereby, since it is possible to increase the power of the first lens group G1, it is possible to reduce the lens total length by reducing the size in the radial direction of a lens on the image side from the second lens group G2.

The imaging lens is configured such that the value of f/f1 is not equal to or greater than an upper limit defined in the conditional expression (10), whereby it is possible to suppress the occurrence of spherical aberration and longitudinal chromatic aberration.

In order to further increase the effect relating to the conditional expression (10), it is more preferable that the following conditional expression (10-1) is satisfied.

$$1.5 < f/f1 < 1.9 \tag{10-1}$$

It is preferable that the first lens group G1 has the positive lens L11, the positive lens L12, the negative lens L13, and the positive lens L14 in order from the object side. With this, since the first lens group G1 has a configuration in which the positive lens is first disposed from the object side, it is possible to achieve reduction in size of the lens in the radial direction. The positive lens L12, the negative lens L13, and the positive lens L14 are disposed in order from the positive lens L11 on the most object side, whereby it is possible to suppress spherical aberration and longitudinal chromatic aberration.

In a case where the first lens group G1 has the positive lens L11, the positive lens L12, the negative lens L13, and the positive lens L14 in order from the object side, it is preferable that the following conditional expression (11) is satisfied.

$$30 < vd13 < 45 \tag{11}$$

where vd13: an Abbe number with respect to d line of the negative lens L13 of the first lens group G1.

The conditional expression (11) is satisfied, whereby it is possible to suppress longitudinal chromatic aberration on a blue side, and to suppress lateral chromatic aberration with satisfactory balance.

In order to further increase the effect relating to the conditional expression (11), it is more preferable that the following conditional expression (11-1) is satisfied.

$$32 < vd13 < 41 \quad (11\text{-}1)$$

In a case where the first lens group G1 has the positive lens L11, the positive lens L12, the negative lens L13, and the positive lens L14 in order from the object side, it is preferable that the following conditional expression (12) is satisfied.

$$-0.3 < (L13r - L14f)/(L13r + L14f) < 0 \quad (12)$$

where

L13r: a paraxial radius of curvature of a surface of the negative lens L13 of the first lens group G1 on the image side L14f: a paraxial radius of curvature of a surface on the object side of the positive lens L14 on the most image side of the first lens group G1.

The imaging lens is configured such that the value of $(L13r-L14f)/(L13r+L14f)$ is not equal to or less than a lower limit defined in the conditional expression (12), whereby it is possible to satisfactorily correct longitudinal chromatic aberration.

The imaging lens is configured such that the value of $(L13r-L14f)/(L13r+L14f)$ is not equal to or greater than an upper limit defined in the conditional expression (12), whereby it is possible to suppress the occurrence of spherical aberration.

In order to further increase the effect relating to the conditional expression (12), it is more preferable that the following conditional expression (12-1) is satisfied.

$$-0.22 < (L13r - L14f)/(L13r + L14f) < -0.05 \quad (12\text{-}1)$$

It is preferable that the second lens group G2 has the negative lens L21, the negative lens L22, and the positive lens L23 in order from the object side. With this, it is possible to suppress variation in astigmatism during focusing.

It is preferable that the following conditional expression (13) is satisfied.

$$0.3 < Yim/f1 < 0.55 \quad (13)$$

where

Yim: a maximum image height f1: the focal length with respect to d line of the first lens group G1.

The imaging lens is configured such that the value of Yim/f1 is not equal to or less than a lower limit defined in the conditional expression (13), whereby, since it is possible to increase the power of the first lens group G1, it is possible to reduce the lens total length by reducing the size in the radial direction of a lens on the image side from the first lens group G1.

The imaging lens is configured such that the value of Yim/f1 is not equal to or greater than an upper limit defined in the conditional expression (13), whereby it is possible to suppress the occurrence of spherical aberration and longitudinal chromatic aberration.

In order to further increase the effect relating to the conditional expression (13), it is more preferable that the following conditional expression (13-1) is satisfied.

$$0.35 < Yim/f1 < 0.47 \quad (13\text{-}1)$$

It is preferable that the following conditional expression (14) is satisfied.

$$-0.8 < Yim/f2 < -0.45 \quad (14)$$

where

Yim: the maximum image height f2: the focal length with respect to d line of the second lens group G2.

The imaging lens is configured such that the value of Yim/f2 is not equal to or less than a lower limit defined in the conditional expression (14), whereby it is possible to reduce the size in the radiation direction of a lens on the image side from the second lens group G2. Furthermore, it is possible to suppress the occurrence of spherical aberration on the image side from the second lens group G2.

The imaging lens is configured such that the value of Yim/f2 is not equal to or greater than an upper limit defined in the conditional expression (14), whereby, since it is possible to increase the power of the second lens group G2, it is possible to reduce the amount of movement of the second lens group G2 during focusing. For this reason, it is possible to reduce the lens total length, and to reduce the size of the lens system.

In order to further increase the effect relating to the conditional expression (14), it is more preferable that the following conditional expression (14-1) is satisfied.

$$-0.7 < Yim/f2 < -0.5 \quad (14\text{-}1)$$

It is preferable that camera shake correction is performed by moving the third lens group G3 in a direction intersecting the optical axis. With this, since a camera shake correction mechanism can be disposed near the center of the lens system, it is possible to secure a space for disposing the camera shake correction mechanism. In particular, in a case where the imaging lens of this embodiment is applied to a mirror-less camera, a back focus is short, a lens which is disposed on the image side in order to secure telecentricity increases in size, and as a result, the lens system increases in size. The camera shake correction mechanism is disposed near the center of the lens system, whereby it is possible to reduce the size of the lens system.

It is preferable that the following conditional expression (15) is satisfied.

$$0.14 < Yim/f3 < 0.38 \quad (15)$$

where

Yim: the maximum image height f3: the focal length with respect to d line of the third lens group G3.

The imaging lens is configured such that the value of Yim/f3 is not equal to or less than a lower limit defined in the conditional expression (15), whereby, since it is possible to increase the power of the third lens group G3, it is possible to reduce the amount of movement of the third lens group G3 during camera shake correction in a case where the third lens group G3 is used as a camera shake correction group.

The imaging lens is configured such that the value of Yim/f3 is not equal to or greater than an upper limit defined in the conditional expression (15), whereby it is possible to suppress the occurrence of spherical aberration.

In order to further increase the effect relating to the conditional expression (15), it is more preferable that the following conditional expression (15-1) is satisfied.

$$0.19 < Yim/f3 < 0.33 \quad (15\text{-}1)$$

It is preferable that the following conditional expression (16) is satisfied.

$$0.1 < Yim/f4 < 0.5 \qquad (16)$$

where

Yim: the maximum image height f4: the focal length with respect to d line of the fourth lens group G4.

The imaging lens is configured such that the value of Yim/f4 is not equal to or less than a lower limit defined in the conditional expression (16), whereby, since it is possible to suppress the height of off-axial rays on the image side from the fourth lens group G4, it is possible to reduce the size of the lens system in the radial direction. In particular, in a case where the imaging lens of this embodiment is applied to a lens interchangeable imaging apparatus, it is possible to achieve reduction in size around the mount for attaching the lens.

The imaging lens is configured such that the value of Yim/f4 is not equal to or greater than an upper limit defined in the conditional expression (16), whereby it is possible to suppress variation in astigmatism during focusing.

In order to further increase the effect relating to the conditional expression (16), it is more preferable that the following conditional expression (16-1) is satisfied.

$$0.15 < Yim/f4 < 0.4 \qquad (16\text{-}1)$$

It is preferable that the following conditional expression (17) is satisfied.

$$-0.5 < Yim/f5 < -0.15 \qquad (17)$$

where

Yim: the maximum image height f5: the focal length with respect to d line of the fifth lens group G5.

The imaging lens is configured such that the value of Yim/f5 is not equal to or less than a lower limit defined in the conditional expression (17), whereby it is possible to secure telecentricity.

The imaging lens is configured such that the value of Yim/f5 is not equal to or greater than an upper limit defined in the conditional expression (17), whereby, since it is possible to reduce the back focus, it is possible to reduce the lens total length. Furthermore, it is possible to secure a space for a focusing unit including the second lens group G2 and the fourth lens group G4 in the lens system.

In order to further increase the effect relating to the conditional expression (17), it is more preferable that the following conditional expression (17-1) is satisfied.

$$-0.45 < Yim/f5 < -0.2 \qquad (17\text{-}1)$$

In the imaging lens of this embodiment, it is preferable that the third lens group G3 has the positive lens L31. With this, since it is possible to make the refractive power of the third lens group G3 positive, it is not necessary to increase the positive refractive power of a lens on the image side from the fourth lens group G4, and thus, it is possible to suppress the occurrence of spherical aberration.

In the imaging lens of this embodiment, it is preferable that the third lens group G3 further has the negative lens L32. With this, it is possible to satisfactorily correct a color shift of spherical aberration.

It is preferable that the third lens group G3 has only a cemented lens in which the positive lens L31 and the negative lens L32 are cemented in order from the object side. With this, since the third lens group G3 can be made to have one lens component, it is possible to simplify the structure of the camera shake correction mechanism, and to suppress aberration variation due to an assembling error.

In the imaging lens of this embodiment, as the material disposed on the most object side, specifically, glass is preferably used, or transparent ceramics may be used.

In a case where the imaging lens of this embodiment is used in a tough environment, it is preferable that protective multilayered film coating is applied. In addition to the protective coating, anti-reflection coating for reducing ghost light during use may be applied.

In the example shown in FIG. 1, although an example where the optical member PP is disposed between the lens system and the image plane Sim has been described, various filters may be provided between the respective lenses or coating having the same operations as various filters may be applied to the surface of any lens, instead of providing a low-pass filter or various filters for cutting a specific wavelength range between the lens system and the image plane Sim.

Arbitrary combinations of the above-described preferred configuration and possible configurations including the configurations relating to the conditional expression are possible, and it is preferable that these combinations are appropriately selectively employed according to required specifications. For example, although the imaging lens of this embodiment is configured such that the conditional expressions (1) to (3) are satisfied, any one of the conditional expressions (1) to (17) and the conditional expressions (1-1) to (17-1) may be satisfied or an arbitrary combination of these conditional expressions may be satisfied.

Next, examples of numerical values of the imaging lens of the invention will be described.

First, an imaging lens of Example 1 will be described. FIG. 1 is a sectional view showing the lens configuration of the imaging lens of Example 1. In FIG. 1 and FIGS. 2 to 5 corresponding to Examples 2 to 5 described below, the optical member PP is also shown. The left side is the object side, and the right side is the image side. The aperture stop St illustrated in the drawings does not necessarily represent the size and/or shape thereof, but indicates the position of the stop on an optical axis Z.

Basic lens data of the imaging lens of Example 1 is shown in Table 1, data relating to specifications is shown in Table 2, and data relating to moving surface distances is shown in Table 3. Hereinafter, although the meanings of the symbols in the tables will be described for Example 1, the meanings of the symbols are basically the same for Examples 2 to 5.

In lens data of Table 1, the column "Si" shows an i-th (where i=1, 2, 3, . . . ) surface number in a sequentially increasing manner toward the image side with the surface of the component on the most object side designated as first, the column "Ri" shows the radius of curvature of the i-th surface, and the column "Di" shows the surface distance between the i-th surface and an (i+1)th surface on the optical axis Z. The column "ndj" shows a refractive index with respect to d line (wavelength of 587.6 nm) of a j-th (where j=1, 2, 3, . . . ) optical element in a sequentially increasing manner toward the image side with an optical element on the most object side designated as first, the column "vdj" shows an Abbe number with respect to d line (wavelength of 587.6 nm) of the j-th optical element, and θg,fj shows a partial dispersion ratio between g line and F line of the j-th optical element.

The sign of the radius of curvature is positive in a case where the surface shape is convex toward the object side, and is negative in a case where the surface shape is convex toward the image side. Basic lens data also includes the stop St and the optical member PP. Text reading (stop) is described along with the surface number in the column of the surface number of the surface corresponding to the stop St. In lens data of Table 1, DD[i] is described in the column "surface distance" for distances which change while changing magnification. The value in the lowermost column of Di is the distance between the surface of the optical member PP on the image side and the image plane Sim.

Data relating to specifications of Table 2 shows the values of a focal length f, an F-Number FNo., and a full angle of view 2ω in each of a state of imaging an object at infinity and a state of imaging an object at a close distance. In Table 2, the state of imaging an object at a close distance shows a specific value of an imaging distance.

In basic lens data, data relating to specifications, and data relating to moving surface distances, degree is used as the unit of angle and mm is used as the unit of length, but other appropriate units may be used since optical systems are usable even if the optical systems are proportionally enlarged or proportionally reduced.

TABLE 1

EXAMPLE 1 - LENS DATA

| Si | Ri | Di | ndj | vdj | θg, fj |
|---|---|---|---|---|---|
| 1 | 92.15480 | 4.750 | 1.48749 | 70.24 | 0.53007 |
| 2 | −227.30838 | 0.150 | | | |
| 3 | 45.46342 | 6.550 | 1.49700 | 81.54 | 0.53748 |
| 4 | −145.56000 | 1.300 | 1.74950 | 35.28 | 0.58704 |
| 5 | 39.06180 | 0.600 | | | |
| 6 | 47.51551 | 3.870 | 1.85150 | 40.78 | 0.56958 |
| 7 | 429.85501 | DD [7] | | | |
| 8 | −204.55655 | 1.300 | 1.83481 | 42.72 | 0.56486 |
| 9 | 34.01646 | 4.000 | | | |
| 10 | −67.33060 | 1.310 | 1.51742 | 52.43 | 0.55649 |
| 11 | 33.76000 | 5.390 | 1.80000 | 29.84 | 0.60178 |
| 12 | −133.90218 | DD [12] | | | |
| 13 (STOP) | ∞ | 2.000 | | | |
| 14 | 99.97122 | 6.450 | 1.49700 | 81.54 | 0.53748 |
| 15 | −35.46500 | 1.300 | 1.72000 | 43.69 | 0.56995 |
| 16 | −70.49540 | DD [16] | | | |
| 17 | −120.66013 | 2.740 | 1.70154 | 41.24 | 0.57664 |
| 18 | −50.75168 | 1.500 | | | |
| 19 | 154.14868 | 4.980 | 1.49700 | 81.54 | 0.53748 |
| 20 | −37.88800 | 1.300 | 1.62588 | 35.70 | 0.58935 |
| 21 | −202.26127 | DD [21] | | | |
| 22 | −51.37287 | 1.310 | 1.80400 | 46.58 | 0.55730 |
| 23 | 39.44800 | 5.380 | 1.83400 | 37.16 | 0.57759 |
| 24 | ∞ | 36.746 | | | |
| 25 | ∞ | 3.200 | 1.51680 | 64.20 | 0.53430 |
| 26 | ∞ | 1.022 | | | |

TABLE 2

EXAMPLE 1 - SPECIFICATIONS (d LINE)

| | INF | 0.28075 m |
|---|---|---|
| f | 116.362 | 84.311 |
| FNo. | 4.12 | 5.94 |
| 2ω [°] | 26.4 | 16.8 |

TABLE 3

EXAMPLE 1 - MOVING SURFACE DISTANCES

| DD [7] | 3.231 | 16.729 |
|---|---|---|
| DD [12] | 20.862 | 7.364 |

TABLE 3-continued

EXAMPLE 1 - MOVING SURFACE DISTANCES

| DD [16] | 24.855 | 12.408 |
|---|---|---|
| DD [21] | 26.884 | 39.331 |

Figure 7:
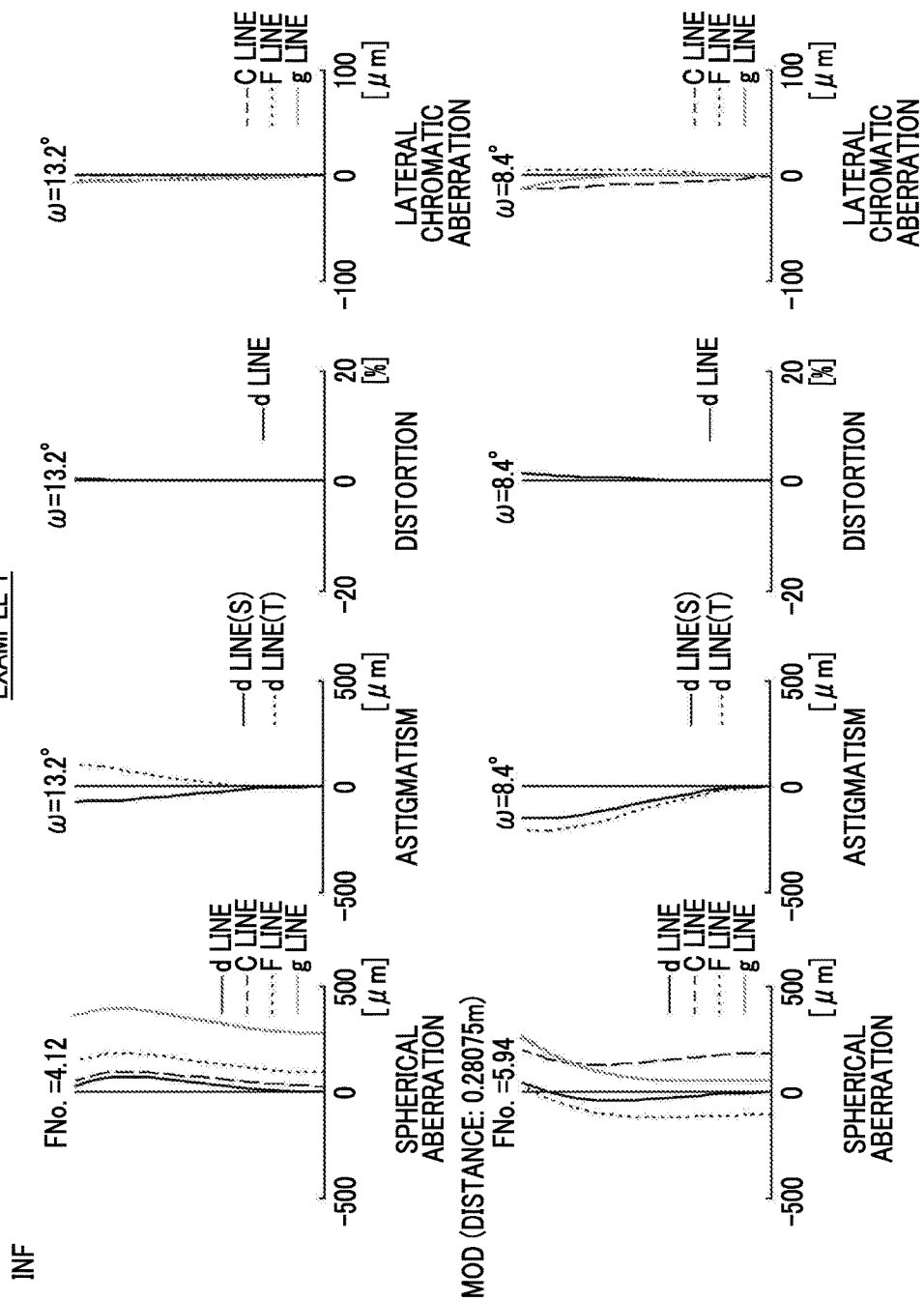
FIG. 7 shows respective aberration diagram of the imaging lens of Example 1 of the invention.

FIG. 7 shows respective aberration diagrams of the imaging lens of Example 1. Spherical aberration, astigmatism, distortion, and lateral chromatic aberration in a state of being focused at infinity are shown in order from the upper left side in FIG. 7, and spherical aberration, astigmatism, distortion, and lateral chromatic aberration in a state (distance of 0.28075 m) in a state of being focused at the closest distance are shown in order from the lower left side in FIG. 7. In the respective aberration diagrams representing spherical aberration, astigmatism, and distortion, aberration is shown with d line (wavelength of 587.6 nm) as a reference wavelength. In the spherical aberration diagram, aberrations with respect to d line (wavelength of 587.6 nm), C line (wavelength of 656.3 nm), F line (wavelength of 486.1 nm), and g line (wavelength of 435.8 nm) are respectively indicated by a solid line, a long broken line, a short broken line, and a gray solid line. In the astigmatism diagram, aberrations in a sagittal direction and a tangential direction are respectively indicated by a sold line and a short broken line. In the lateral chromatic aberration diagram, aberrations with respect to C line (wavelength of 656.3 nm), F line (wavelength of 486.1 nm), and g line (wavelength of 435.8 nm) are respectively indicated by a long broken line, a short broken line, and a gray solid line. In the spherical aberration diagram, FNo. means an F-Number, and in other aberration diagrams, ω means a half angle of view.

The symbols, the meanings, and the description methods of respective data described in the description of Example 1 described above will apply to the following examples unless otherwise specifically described, and thus, overlapping description will be omitted in the following description.

Figure 8:
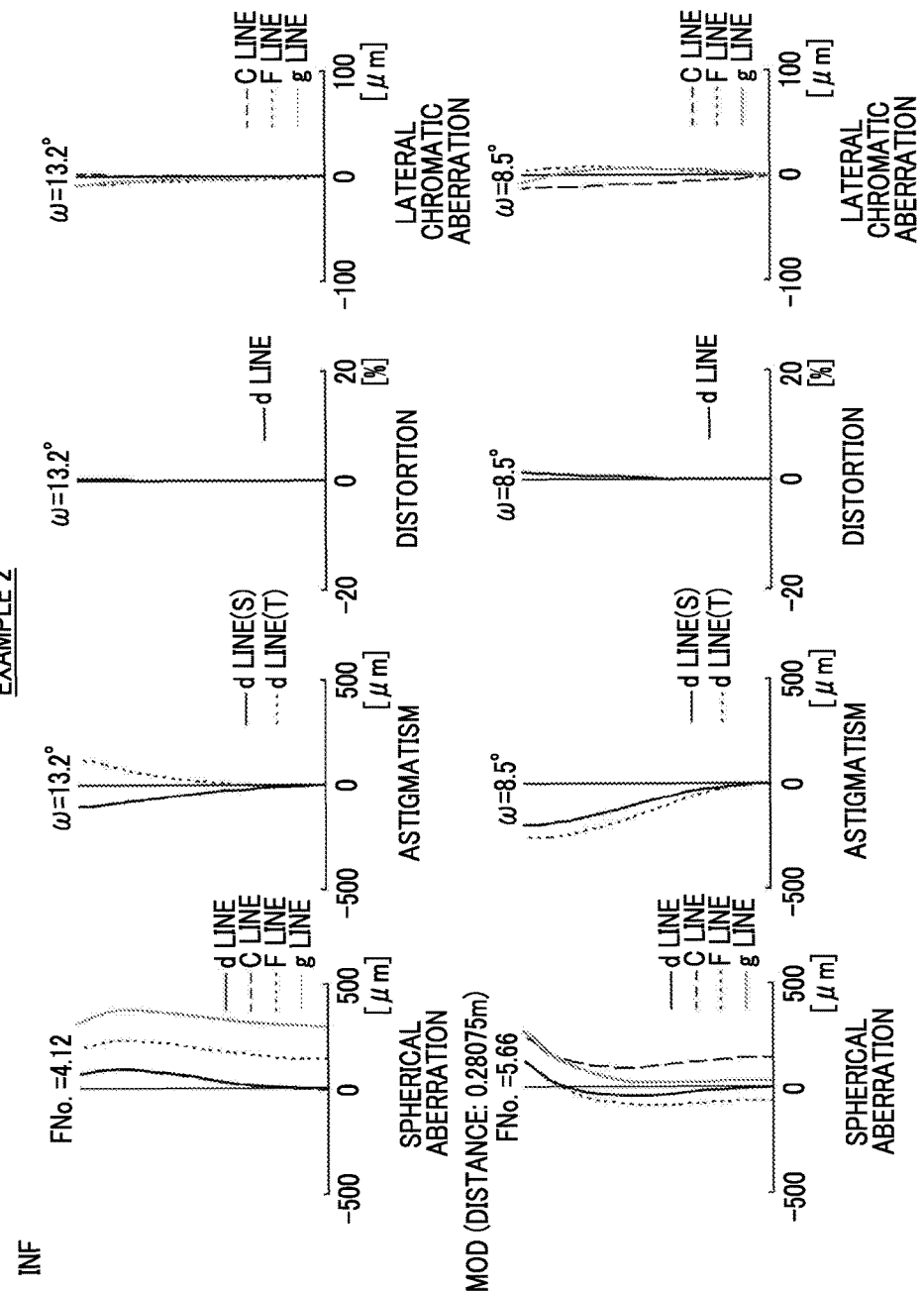
FIG. 8 shows respective aberration diagram of the imaging lens of Example 2 of the invention.

Next, an imaging lens of Example 2 will be described. FIG. 2 is a sectional view showing the configuration of the imaging lens of Example 2. The imaging lens of Example 2 has the same lens groups and the same number of lenses as those of Example 1. Lens data of the imaging lens of Example 2 is shown in Table 4, data relating to specifications is shown in Table 5, data relating to moving surface distances is shown in Table 6, and respective aberration diagrams are shown in FIG. 8.

TABLE 4

EXAMPLE 2 - LENS DATA

| Si | Ri | Di | ndj | vdj | θg, fj |
|---|---|---|---|---|---|
| 1 | 79.42973 | 4.875 | 1.48749 | 70.24 | 0.53007 |
| 2 | −298.93495 | 0.150 | | | |
| 3 | 43.41839 | 6.497 | 1.49700 | 81.54 | 0.53748 |
| 4 | −173.72597 | 1.300 | 1.83400 | 37.34 | 0.57908 |
| 5 | 39.06282 | 0.611 | | | |
| 6 | 47.72468 | 4.125 | 1.83481 | 42.72 | 0.56486 |
| 7 | 6463.72415 | DD [7] | | | |
| 8 | −168.71659 | 1.300 | 1.83481 | 42.72 | 0.56486 |
| 9 | 32.58873 | 4.238 | | | |
| 10 | −87.82021 | 1.310 | 1.72047 | 34.71 | 0.58350 |
| 11 | 32.07308 | 5.500 | 2.05090 | 26.94 | 0.60526 |
| 12 | −162.87433 | DD [12] | | | |
| 13 (STOP) | ∞ | 2.000 | | | |
| 14 | 100.10881 | 6.300 | 1.49700 | 81.54 | 0.53748 |
| 15 | −36.89167 | 1.300 | 1.79952 | 42.22 | 0.56727 |
| 16 | −66.08724 | DD [16] | | | |
| 17 | −114.07498 | 2.724 | 1.67300 | 38.15 | 0.57545 |
| 18 | −49.80311 | 1.500 | | | |

TABLE 4-continued

EXAMPLE 2 - LENS DATA

| Si | Ri | Di | ndj | vdj | θg, fj |
|---|---|---|---|---|---|
| 19 | 160.27256 | 4.544 | 1.49700 | 81.54 | 0.53748 |
| 20 | −43.82194 | 1.300 | 1.69895 | 30.13 | 0.60298 |
| 21 | −146.95847 | DD [21] | | | |
| 22 | −48.96668 | 1.310 | 1.81600 | 46.62 | 0.55682 |
| 23 | 35.07179 | 6.250 | 1.83400 | 37.16 | 0.57759 |
| 24 | −821.51397 | 35.828 | | | |
| 25 | ∞ | 3.200 | 1.51680 | 64.20 | 0.53430 |
| 26 | ∞ | 1.024 | | | |

TABLE 5

EXAMPLE 2 - SPECIFICATIONS (d LINE)

| | INF | 0.28075 m |
|---|---|---|
| f' | 116.376 | 83.889 |
| FNo. | 4.12 | 5.66 |
| 2ω [°] | 26.4 | 17.0 |

TABLE 6

EXAMPLE 2 - MOVING SURFACE DISTANCES

| DD [7] | 3.083 | 16.561 |
|---|---|---|
| DD [12] | 20.468 | 6.990 |
| DD [16] | 24.493 | 12.046 |
| DD [21] | 27.749 | 40.196 |

Figure 9:
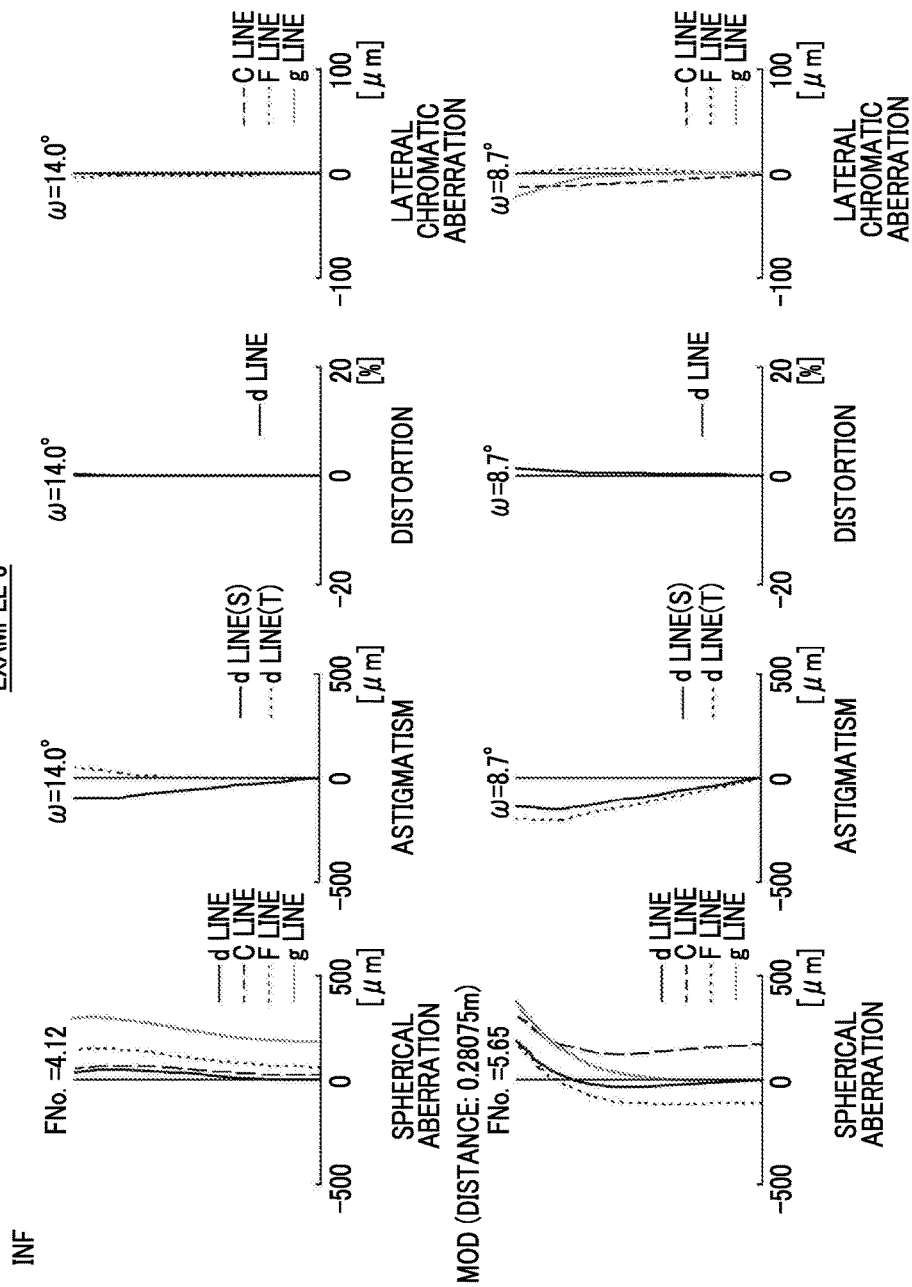
FIG. 9 shows respective aberration diagram of the imaging lens of Example 3 of the invention.

Next, an imaging lens of Example 3 will be described. FIG. 3 is a sectional view showing the configuration of the imaging lens of Example 3. The imaging lens of Example 3 has the same lens groups and the same number of lenses as those of Example 1. Lens data of the imaging lens of Example 3 is shown in Table 7, data relating to specifications is shown in Table 8, data relating to moving surface distances is shown in Table 9, and respective aberration diagrams are shown in FIG. 9.

TABLE 7

EXAMPLE 3 - LENS DATA

| Si | Ri | Di | ndj | vdj | θg, fj |
|---|---|---|---|---|---|
| 1 | 77.12073 | 4.852 | 1.48749 | 70.24 | 0.53007 |
| 2 | −423.87755 | 0.150 | | | |
| 3 | 46.47039 | 6.246 | 1.49700 | 81.54 | 0.53748 |
| 4 | −182.16226 | 1.300 | 1.72047 | 34.71 | 0.58350 |
| 5 | 36.76489 | 0.760 | | | |
| 6 | 46.45850 | 3.996 | 1.83481 | 42.72 | 0.56486 |
| 7 | 525.46653 | DD [7] | | | |
| 8 | −303.01778 | 1.300 | 1.83481 | 42.72 | 0.56486 |
| 9 | 35.34355 | 5.236 | | | |
| 10 | −89.44772 | 1.310 | 1.56732 | 42.82 | 0.57309 |
| 11 | 35.92053 | 5.500 | 1.85478 | 24.80 | 0.61232 |
| 12 | −350.37437 | DD [12] | | | |
| 13 (STOP) | ∞ | 2.000 | | | |
| 14 | 104.33762 | 6.227 | 1.59522 | 67.73 | 0.54426 |
| 15 | −36.53939 | 1.300 | 1.83400 | 37.16 | 0.57759 |
| 16 | −78.35512 | DD [16] | | | |
| 17 | −98.53784 | 2.681 | 1.80000 | 29.84 | 0.60178 |
| 18 | −48.81399 | 1.061 | | | |
| 19 | 165.53791 | 6.179 | 1.49700 | 81.54 | 0.53748 |
| 20 | −39.83303 | 1.300 | 1.74000 | 28.30 | 0.60790 |
| 21 | −142.11339 | DD [21] | | | |
| 22 | −50.34783 | 1.310 | 1.79952 | 42.22 | 0.56727 |
| 23 | 42.38871 | 6.250 | 1.85026 | 32.27 | 0.59299 |
| 24 | 7916.50148 | 36.726 | | | |

TABLE 7-continued

EXAMPLE 3 - LENS DATA

| Si | Ri | Di | ndj | vdj | θg, fj |
|---|---|---|---|---|---|
| 25 | ∞ | 3.200 | 1.51680 | 64.20 | 0.53430 |
| 26 | ∞ | 1.031 | | | |

TABLE 8

EXAMPLE 3 - SPECIFICATIONS (d LINE)

| | INF | 0.28075 m |
|---|---|---|
| f' | 116.312 | 84.738 |
| FNo. | 4.12 | 5.65 |
| 2ω [°] | 28.0 | 17.4 |

TABLE 9

EXAMPLE 3 - MOVING SURFACE DISTANCES

| DD [7] | 3.049 | 16.436 |
|---|---|---|
| DD [12] | 21.356 | 7.969 |
| DD [16] | 24.639 | 12.131 |
| DD [21] | 25.029 | 37.537 |

Figure 10:
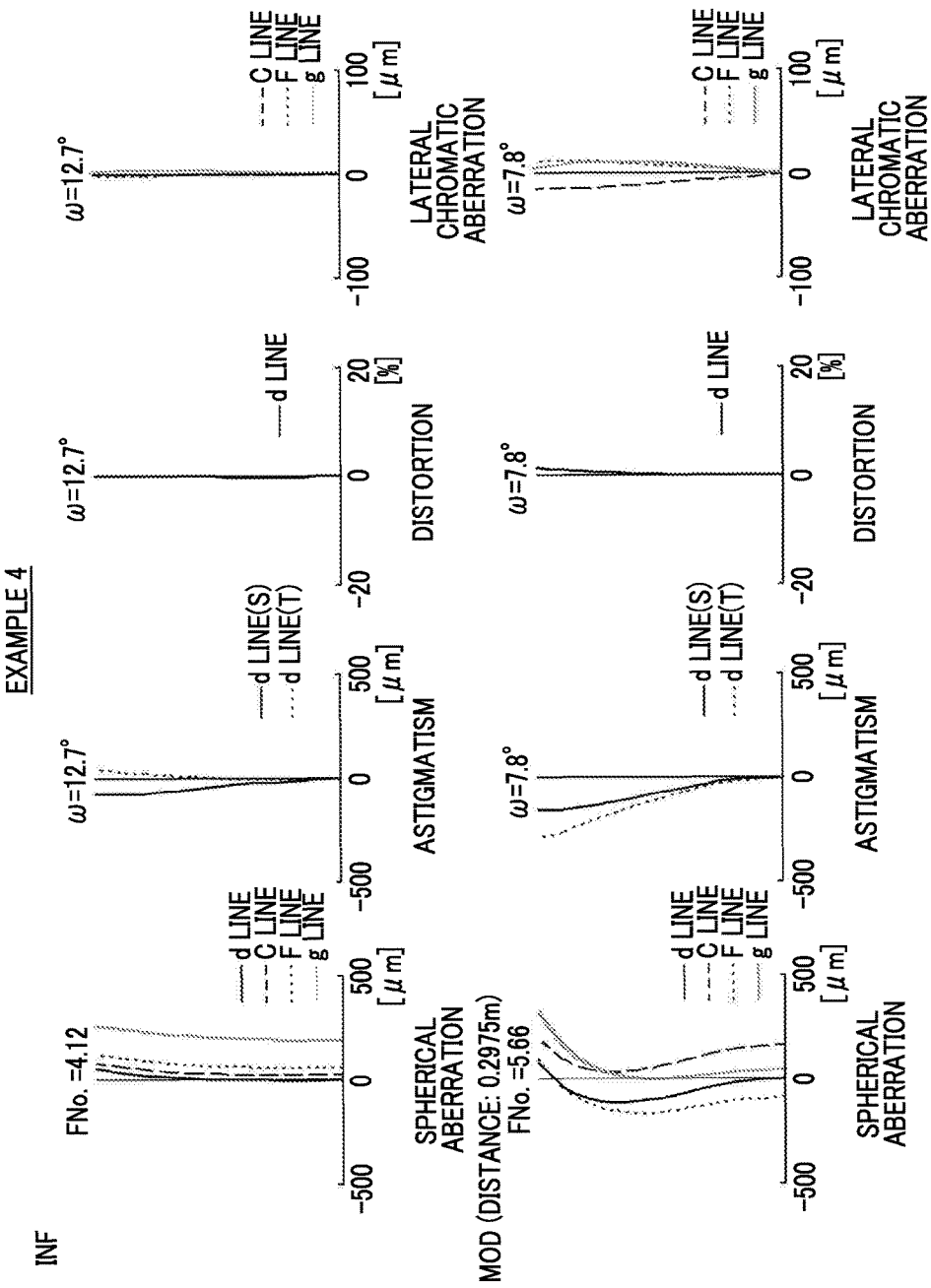
FIG. 10 shows respective aberration diagram of the imaging lens of Example 4 of the invention.

Next, an imaging lens of Example 4 will be described. FIG. 4 is a sectional view showing the configuration of the imaging lens of Example 4. The imaging lens of Example 4 has the same lens groups and the same number of lenses as those of Example 1. Lens data of the imaging lens of Example 4 is shown in Table 10, data relating to specifications is shown in Table 11, data relating to moving surface distances is shown in Table 12, and respective aberration diagrams are shown in FIG. 10.

TABLE 10

EXAMPLE 4 - LENS DATA

| Si | Ri | Di | ndj | vdj | θg, fj |
|---|---|---|---|---|---|
| 1 | 75.91333 | 4.800 | 1.48749 | 70.24 | 0.53007 |
| 2 | −901.23584 | 0.150 | | | |
| 3 | 38.92064 | 7.162 | 1.49700 | 81.54 | 0.53748 |
| 4 | −275.18451 | 1.310 | 1.60342 | 38.03 | 0.58356 |
| 5 | 31.57478 | 1.251 | | | |
| 6 | 44.16878 | 3.935 | 1.69680 | 55.53 | 0.54341 |
| 7 | 265.97731 | DD [7] | | | |
| 8 | −358.29452 | 1.300 | 1.76200 | 40.10 | 0.57655 |
| 9 | 34.84547 | 2.888 | | | |
| 10 | −169.11451 | 1.310 | 1.51742 | 52.43 | 0.55649 |
| 11 | 31.52882 | 3.921 | 1.84666 | 23.78 | 0.62054 |
| 12 | 158.13209 | DD [12] | | | |
| 13 (STOP) | ∞ | 2.000 | | | |
| 14 | 91.21953 | 6.010 | 1.59522 | 67.73 | 0.54426 |
| 15 | −37.66483 | 1.300 | 1.83400 | 37.16 | 0.57759 |
| 16 | −83.57932 | DD [16] | | | |
| 17 | −190.53218 | 2.840 | 1.83400 | 37.16 | 0.57759 |
| 18 | −56.78810 | 1.500 | | | |
| 19 | 178.57868 | 6.771 | 1.49700 | 81.54 | 0.53748 |
| 20 | −38.36455 | 1.300 | 1.72342 | 37.95 | 0.58370 |
| 21 | −274.91269 | DD [21] | | | |
| 22 | −67.59701 | 1.300 | 1.61340 | 44.27 | 0.56340 |
| 23 | 28.42693 | 6.510 | 1.61293 | 37.00 | 0.58632 |
| 24 | 213.66762 | 43.775 | | | |
| 25 | ∞ | 3.200 | 1.51680 | 64.20 | 0.53430 |
| 26 | ∞ | 1.033 | | | |

TABLE 11

EXAMPLE 4 - SPECIFICATIONS (d LINE)

|  | INF | 0.2975 m |
|---|---|---|
| f' | 122.217 | 91.928 |
| FNo. | 4.12 | 5.66 |
| 2ω [°] | 25.4 | 15.6 |

TABLE 12

EXAMPLE 4 - MOVING SURFACE DISTANCES

| DD [7] | 2.500 | 15.913 |
|---|---|---|
| DD [12] | 24.634 | 11.221 |
| DD [16] | 25.151 | 12.439 |
| DD [21] | 15.490 | 28.202 |

Figure 11:
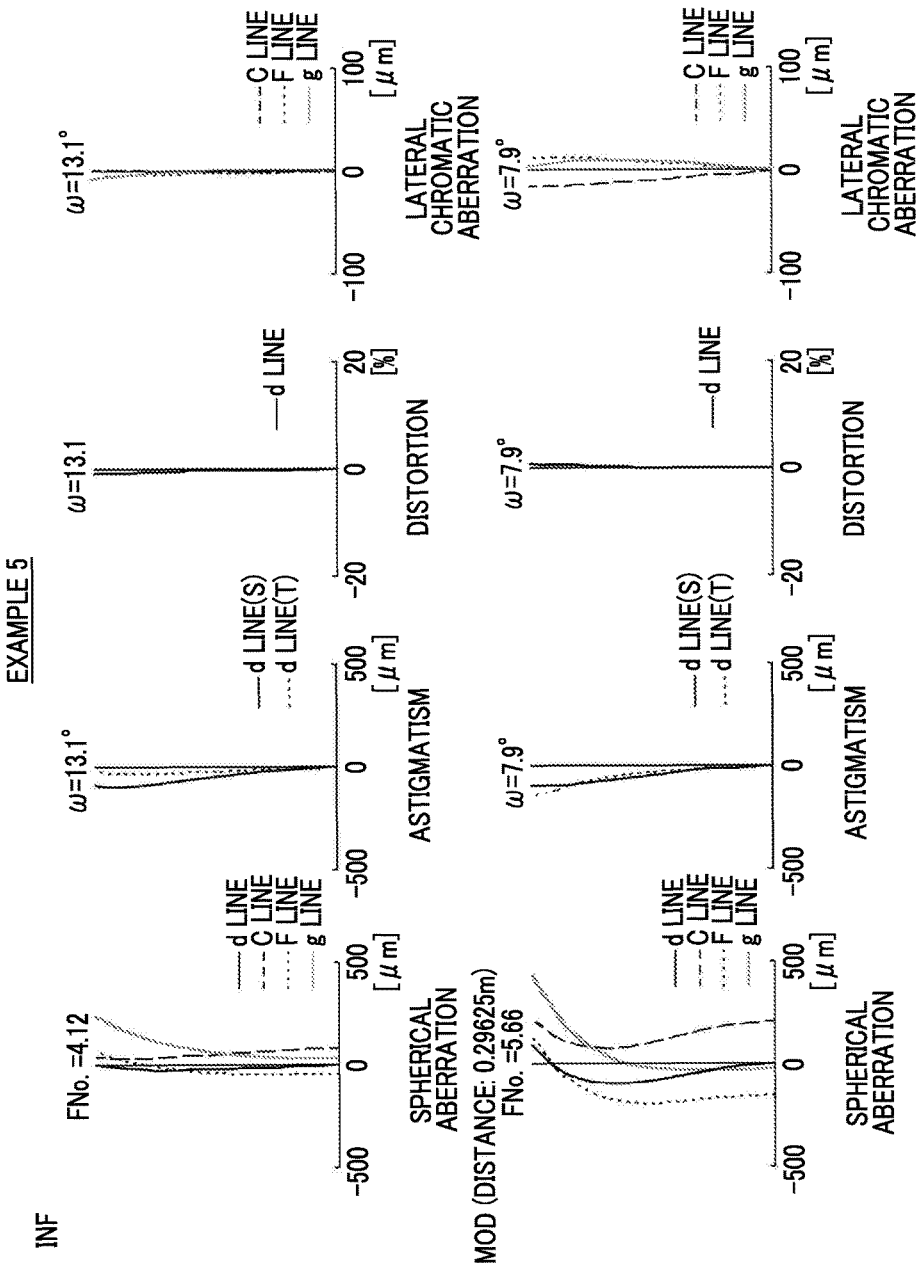
FIG. 11 shows respective aberration diagram of the imaging lens of Example 5 of the invention.

Next, an imaging lens of Example 5 will be described. FIG. 5 is a sectional view showing the lens configuration of the imaging lens of Example 5. The imaging lens of Example 5 has the same lens groups and the same number of lenses as those of Example 1, except that a fourth lens group G4 has two lenses including lenses L41 and L42 in order from the object side. Lens data of the imaging lens of Example 5 is shown in Table 13, data relating to specifications is shown in Table 14, data relating to moving surface distances is shown in Table 15, and respective aberration diagrams are shown in FIG. 11.

TABLE 13

EXAMPLE 5 - LENS DATA

| Si | Ri | Di | ndj | vdj | θg, fj |
|---|---|---|---|---|---|
| 1 | 78.82662 | 5.027 | 1.48749 | 70.24 | 0.53007 |
| 2 | −1077.13764 | 0.150 | | | |
| 3 | 42.44558 | 6.639 | 1.49700 | 81.54 | 0.53748 |
| 4 | −3289.30984 | 1.500 | 1.62588 | 35.70 | 0.58935 |
| 5 | 33.46589 | 1.278 | | | |
| 6 | 45.83183 | 4.074 | 1.80400 | 46.58 | 0.55730 |
| 7 | 230.75096 | DD [7] | | | |
| 8 | −364.60488 | 1.500 | 1.72916 | 54.68 | 0.54451 |
| 9 | 38.05748 | 2.888 | | | |
| 10 | −1344.02480 | 1.510 | 1.51742 | 52.43 | 0.55649 |
| 11 | 29.39772 | 3.906 | 1.80518 | 25.42 | 0.61616 |
| 12 | 72.94994 | DD [12] | | | |
| 13 (STOP) | ∞ | 2.000 | | | |
| 14 | 101.49810 | 6.010 | 1.59522 | 67.73 | 0.54426 |
| 15 | −36.29705 | 1.500 | 1.80440 | 39.59 | 0.57297 |
| 16 | −79.31653 | DD [16] | | | |
| 17 | −222081.53762 | 5.875 | 1.49700 | 81.54 | 0.53748 |
| 18 | −31.43658 | 1.500 | 1.72342 | 37.95 | 0.58370 |
| 19 | −47.71266 | DD [19] | | | |
| 20 | −52.47865 | 1.510 | 1.61800 | 63.33 | 0.54414 |
| 21 | 93.11420 | 4.031 | 1.80100 | 34.97 | 0.58642 |
| 22 | −854.66935 | 28.954 | | | |
| 23 | ∞ | 3.200 | 1.51680 | 64.20 | 0.53430 |
| 24 | ∞ | 1.076 | | | |

TABLE 14

EXAMPLE 5 - SPECIFICATIONS (d LINE)

|  | INF | 0.29625 m |
|---|---|---|
| f' | 118.992 | 89.375 |
| FNo. | 4.12 | 5.66 |
| 2ω [°] | 26.2 | 15.8 |

TABLE 15

EXAMPLE 5 - MOVING SURFACE DISTANCES

| DD [7] | 2.500 | 15.272 |
|---|---|---|
| DD [12] | 23.134 | 10.362 |
| DD [16] | 26.445 | 5.915 |
| DD [19] | 39.863 | 60.393 |

Values corresponding to the conditional expressions (1) to (17) of the imaging lenses of Examples 1 to 5 are shown in Table 16. In all examples, d line is used as a reference wavelength, and the values shown in Table 16 described below are with respect to the reference wavelength.

TABLE 16

| EXPRESSION NUMBER | CONDITIONAL EXPRESSION | EXAMPLE 1 | EXAMPLE 2 | EXAMPLE 3 | EXAMPLE 4 | EXAMPLE 5 |
|---|---|---|---|---|---|---|
| (1) | $(1 - \beta 2^2) \times \beta 2r^2 + (1 - \beta 4^2) \times \beta 4r^2$ | −0.04566 | −0.03703 | −0.18645 | −0.67346 | −1.22357 |
| (2) | $(1 - \beta 2^2) \times \beta 2r^2 - (1 - \beta 4^2) \times \beta 4r^2$ | −4.75735 | −4.75137 | −4.74659 | −4.85693 | −3.92304 |
| (3) | f/f4 | 1.28446 | 1.27518 | 1.23338 | 1.23501 | 0.95818 |
| (4) | DL/TL | 0.76316 | 0.76845 | 0.76460 | 0.72304 | 0.81127 |
| (5) | f2/f4 | −0.54395 | −0.54871 | −0.49840 | −0.46107 | −0.34681 |
| (6) | TL/BF | 4.33796 | 4.43989 | 4.36455 | 3.69478 | 5.47864 |
| (7) | vd4p − vd4n | 45.84 | 51.41 | 53.24 | 43.59 | 43.59 |
| (8) | vd5p | 37.16 | 37.16 | 32.27 | 37.00 | 34.97 |
| (9) | f/f5 | −1.73159 | −1.75283 | −1.71944 | −1.47710 | −1.04966 |
| (10) | f/f1 | 1.59934 | 1.59381 | 1.62808 | 1.70855 | 1.67280 |
| (11) | vd13 | 35.28 | 37.34 | 34.71 | 38.03 | 35.70 |
| (12) | (L13r − L14f)/(L13r + L14f) | −0.09764 | −0.09981 | −0.11648 | −0.16627 | −0.15594 |
| (13) | Yim/f1 | 0.37798 | 0.37662 | 0.38493 | 0.38444 | 0.38660 |
| (14) | Yim/f2 | −0.55806 | −0.54916 | −0.58510 | −0.60271 | −0.63851 |
| (15) | Yim/f3 | 0.24261 | 0.24221 | 0.26750 | 0.27699 | 0.27897 |
| (16) | Yim/f4 | 0.30356 | 0.30133 | 0.29161 | 0.27789 | 0.22144 |
| (17) | Yim/f5 | −0.40923 | −0.41420 | −0.40653 | −0.33236 | −0.24258 |

As can be understood from data described above, all of the imaging lenses of Examples 1 to 5 satisfy the conditional expressions (1) to (17), and are imaging lenses in which chromatic aberration is satisfactorily corrected even during short-distance imaging.

Figure 12:
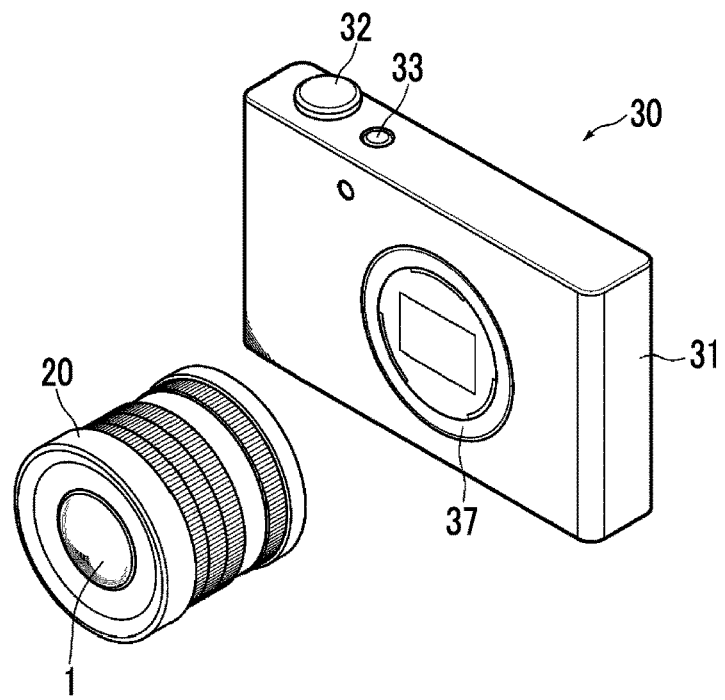
FIG. 12 is a schematic configuration diagram of an imaging apparatus according to the embodiment of the invention when viewed from a front side.
Figure 13:
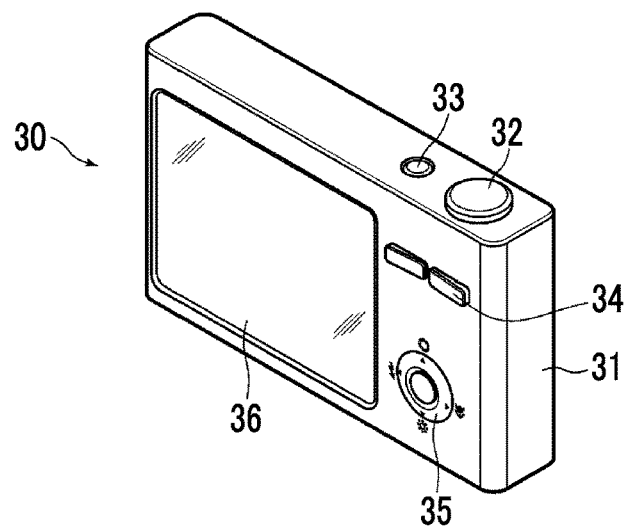
FIG. 13 is a schematic configuration diagram of the imaging apparatus according to the embodiment of the invention when viewed from a rear side.

Next, an imaging apparatus according to an embodiment of the invention will be described. FIGS. 12 and 13 are appearance diagrams showing one configuration example of a mirror-less single-lens camera using the imaging lens according to the embodiment of the invention as an example of the imaging apparatus according to the embodiment of the invention.

In particular, FIG. 12 shows the appearance of a camera 30 when viewed from a front side, and FIG. 13 shows the appearance of the camera 30 when viewed from a rear side. The camera 30 includes a camera body 31, and on the upper surface of the camera body 31, a release button 32 and a power button 33 are provided. On the rear surface of the camera body 31, a display unit 36 and operating units 34 and 35 are provided. The display unit 36 is provided to display a captured image.

An imaging opening, into which light from an imaging target enters, is provided in a center portion on the front side of the camera body 31, a mount 37 is provided at a position corresponding to the imaging opening, and an interchangeable lens 20 is mounted in the camera body 31 through the mount 37. The interchangeable lens 20 is a lens in which a lens member constituting the imaging lens 1 of this embodiment is accommodated in a lens barrel. Inside the camera body 31, an imaging element, such as a CCD, which outputs an imaging signal according to a subject image formed by the interchangeable lens 20, a signal processing circuit which processes the imaging signal output from the imaging element to generate an image, a recording medium on which the generated image is recorded, and the like are provided. In this camera, the release button 32 is pressed, whereby imaging of a still image or a motion image for one frame is performed and image data obtained by imaging is recorded on the recording medium (not shown) inside the camera body 31.

The imaging lens of this embodiment is used as the interchangeable lens 20 in such a mirror-less single-lens camera, whereby it is possible to obtain video with high image quality in which chromatic aberration is satisfactorily corrected even during short-distance imaging.

Although the invention has been described in connection with the embodiment and the examples, the invention is not limited to the foregoing embodiment and examples, and various modifications may be made. For example, the values of the radius of curvature, the surface distance, the refractive index, the Abbe number, and the like of each lens component are not limited to the values shown in the respective examples of numerical values, and may take other values.

What is claimed is:

1. An imaging lens comprising, in order from an object side:
   a first lens group having positive refractive power;
   a second lens group having negative refractive power;
   a third lens group having positive refractive power;
   a fourth lens group having positive refractive power; and
   a fifth lens group having negative refractive power,
   wherein, in a case of changing focus from an object at infinity to an object at the closest distance, the distance between adjacent lens groups changes,
   in a case of changing focus from the object at infinity to the object at the closest distance, the first lens group is immovable,
   in a case of changing focus from the object at infinity to the object at the closest distance, the second lens group and the fourth lens group are moved in an optical axis direction along different trajectories from each other,
   the following conditional expressions are satisfied;

$$-1.5 < (1-\beta 2^2) \times \beta 2r^2 + (1-\beta 4^2) \times \beta 4r^2 < 0 \quad (1)$$

$$-5.5 < (1-\beta 2^2) \times \beta 2r^2 - (1-\beta 4^2) \times \beta 4r^2 < -2.5 \quad (2)$$

$$3 < TL/BF < 5.9 \quad (3)$$

where
β2: a lateral magnification of the second lens group in a state of being focused at infinity
β2r: a combined lateral magnification of a lens group disposed on the image side from the second lens group in a state of being focused at infinity
β4: a lateral magnification of the fourth lens group in a state of being focused at infinity
β4r: a combined lateral magnification of a lens group disposed on the image side from the fourth lens group in a state of being focused at infinity
TL: a lens total length in a case where an air converted length corresponds to a back focus
BF: the air converted distance between an image-side surface apex of a lens on the most image side of a lens system and an image plane.

2. The imaging lens according to claim 1,
wherein the following conditional expression is satisfied;

$$0.7 < f/f4 < 1.4 \quad (4)$$

where
f: a focal length with respect to d line of the entire lens system in a state of being focused at infinity
f4: a focal length with respect to d line of the fourth lens group.

3. The imaging lens according to claim 1,
wherein the following conditional expression is satisfied;

$$-0.6 < f2/f4 < -0.2 \quad (5)$$

where
f2: a focal length with respect to d line of the second lens group
f4: a focal length with respect to d line of the fourth lens group.

4. The imaging lens according to claim 1,
wherein the following conditional expression is satisfied;

$$0.61 < DL/TL < 0.82 \quad (6)$$

where
DL: the distance between a surface apex on the most object side and a surface apex on the most image side of the lens system in a state of being focused at infinity
TL: the lens total length in a case where the air converted length corresponds to the back focus.

5. The imaging lens according to claim 1,
wherein the fourth lens group has a cemented lens in which a positive lens and a negative lens are cemented in order from the object side.

6. The imaging lens according to claim 5,
wherein the following conditional expression is satisfied;

$$41 < vd4p - vd4n < 58 \quad (7)$$

where
vd4p: an Abbe number with respect to d line of the positive lens of the fourth lens group
vd4n: an Abbe number with respect to d line of the negative lens of the fourth lens group.

7. The imaging lens according to claim 1,
wherein the second lens group is moved toward the image side in a case of changing focus from the object at infinity to the object at the closest distance, and the fourth lens group is moved toward the object side in a case of changing focus from the object at infinity to the object at the closest distance.

8. The imaging lens according to claim 1,
wherein the fifth lens group has one lens component.

9. The imaging lens according to claim 8,
wherein the fifth lens group has a cemented lens in which a negative lens and a positive lens are cemented in order from the object side.

10. The imaging lens according to claim 9,
wherein the following conditional expression is satisfied;

$$30 < vd5p < 45 \quad (8)$$

where
vd5p: an Abbe number with respect to d line of the positive lens of the fifth lens group.

11. The imaging lens according to claim 1,
wherein the following conditional expression is satisfied;

$$-2 < f/f5 < -0.8 \quad (9)$$

where
f: a focal length with respect to d line of the entire lens system in a state of being focused at infinity
f5: a focal length with respect to d line of the fifth lens group.

12. The imaging lens according to claim 1,
wherein the following conditional expression is satisfied;

$$1.4 < f/f1 < 2.0 \quad (10)$$

where
f: a focal length with respect to d line of the entire lens system in a state of being focused at infinity
f1: a focal length with respect to d line of the first lens group.

13. The imaging lens according to claim 1,
wherein the conditional expression is satisfied;

$$-1.35 < (1-\beta 2^2) \times \beta 2r^2 + (1-\beta 4^2) \times \beta 4r^2 < -0.02 \quad (1\text{-}1)$$

where
β2: the lateral magnification of the second lens group in a state of being focused at infinity
β2r: the combined lateral magnification of a lens group disposed on the image side from the second lens group in a state of being focused at infinity
β4: the lateral magnification of the fourth lens group in a state of being focused at infinity
β4r: the combined lateral magnification of a lens group disposed on the image side from the fourth lens group in a state of being focused at infinity.

14. The imaging lens according to claim 1,
wherein the following conditional expression is satisfied;

$$-5.0 < (1-\beta 2^2) \times \beta 2r^2 - (1-\beta 4^2) \times \beta 4r^2 < -3.2 \quad (2\text{-}1)$$

where
β2: the lateral magnification of the second lens group in a state of being focused at infinity
β2r: the combined lateral magnification of a lens group disposed on the image side from the second lens group in a state of being focused at infinity
β4: the lateral magnification of the fourth lens group in a state of being focused at infinity
β4r: a combined lateral magnification of a lens group disposed on the image side from the fourth lens group in a state of being focused at infinity.

15. The imaging lens according to claim 1,
wherein the following conditional expression is satisfied;

$$3.3 < TL/BF < 5.7 \quad (3\text{-}1)$$

where
TL: the lens total length in a case where the air converted length corresponds to the back focus
BF: the air converted distance between an image-side surface apex of a lens on the most image side of the lens system and the image plane.

16. The imaging lens according to claim 1,
wherein the following conditional expression is satisfied;

$$0.8 < f/f4 < 1.3 \quad (4\text{-}1)$$

where
f: a focal length with respect to d line of the entire lens system in a state of being focused at infinity
f4: a focal length with respect to d line of the fourth lens group.

17. The imaging lens according to claim 1,
wherein the following conditional expression is satisfied;

$$-0.57 < f2/f4 < -0.3 \quad (5\text{-}1)$$

where
f2: a focal length with respect to d line of the second lens group
f4: a focal length with respect to d line of the fourth lens group.

18. The imaging lens according to claim 1,
wherein the following conditional expression is satisfied;

$$0.66 < DL/TL < 0.815 \quad (6\text{-}1)$$

where
DL: the distance between a surface apex on the most object side and a surface apex on the most image side of the lens system in a state of being focused at infinity
TL: the lens total length in a case where the air converted length corresponds to the back focus.

19. The imaging lens according to claim 5,
wherein the following conditional expression is satisfied;

$$42 < vd4p - vd4n < 56 \quad (7\text{-}1)$$

where
vd4p: an Abbe number with respect to d line of the positive lens of the fourth lens group
vd4n: an Abbe number with respect to d line of the negative lens of the fourth lens group.

20. An imaging apparatus comprising:
the imaging lens according to claim 1.

* * * * *